United States Patent
Bakshi

(10) Patent No.: US 9,998,708 B1
(45) Date of Patent: Jun. 12, 2018

(54) NETWORK ARCHITECTURE FOR IMMERSIVE AUDIO-VISUAL COMMUNICATIONS BY TEMPORARY COMMUNICATION STRUCTURES

(71) Applicant: Shared Space Studios, LLC, Bethesda, MD (US)

(72) Inventor: Amar Chopra Bakshi, Bethesda, MD (US)

(73) Assignee: Shared Space Studios LLC, Bethesda, MD (US)

( * ) Notice: Subject to any disclaimer, the term of this patent is extended or adjusted under 35 U.S.C. 154(b) by 0 days. days.

(21) Appl. No.: 15/191,364

(22) Filed: Jun. 23, 2016

Related U.S. Application Data

(63) Continuation-in-part of application No. 14/807,847, filed on Jul. 23, 2015.

(60) Provisional application No. 62/028,170, filed on Jul. 23, 2014, provisional application No. 62/042,342, filed on Aug. 27, 2014.

(51) Int. Cl.
  *H04N 7/14* (2006.01)
  *H04N 7/15* (2006.01)
  *G06F 3/14* (2006.01)

(52) U.S. Cl.
  CPC ............ *H04N 7/15* (2013.01); *G06F 3/1446* (2013.01)

(58) Field of Classification Search
  USPC ........... 348/14.07, 423.1, 564, 782, E7.079, 348/E7.081, 208.3
  See application file for complete search history.

(56) References Cited

U.S. PATENT DOCUMENTS

| | | | |
|---|---|---|---|
| 4,717,021 A | | 1/1988 | Ditzig |
| 5,164,827 A | * | 11/1992 | Paff .................. G08B 13/19608 348/143 |
| 6,205,716 B1 | | 3/2001 | Peltz |
| 6,675,540 B1 | | 1/2004 | Rokes |

(Continued)

FOREIGN PATENT DOCUMENTS

| | | |
|---|---|---|
| CA | 2782973 A1 | 6/2010 |
| CN | 103324601 A | 9/2013 |

(Continued)

*Primary Examiner* — Yosef K Laekemariam
(74) *Attorney, Agent, or Firm* — Patent Law Works LLP

(57) ABSTRACT

This invention is directed to improving communication among people at remote locations, accomplished at low cost, by communication schemes involving "portal" structures, "channels" and "phonos." The portal structures are mobile and easily deployed to the remote locations, for quick assembly and use, creating an audio-visual immersive communication experience for its users. A portal network architecture includes a plurality of portals located in different remote locations, configured to provide identical spaces that facilitate audio-video, immersive conferencing among users at the various portal sites. The portal interiors include favorable lighting and camera configurations to facilitate display of life-size, realistic, and planar images of the users while maintaining eye contact between them. The "channels" facilitate viewing of landscape or persons from a distance and "phonos" implementations provide an unmediated aural link between different locations, enabling both real-time conversation and transmission of ambient sounds.

20 Claims, 20 Drawing Sheets

(56) References Cited

U.S. PATENT DOCUMENTS

| | | | |
|---|---|---|---|
| D618,644 S | 6/2010 | Graham et al. | |
| 7,870,686 B2 | 1/2011 | Hines | |
| 8,472,174 B2 | 6/2013 | Idems et al. | |
| 8,593,578 B1 | 11/2013 | Geronimi | |
| 8,621,787 B2 | 1/2014 | Barry et al. | |
| 8,955,258 B2 | 2/2015 | Jacques et al. | |
| 8,996,392 B2 | 3/2015 | Cashman et al. | |
| 9,052,536 B2 | 6/2015 | Artwohl et al. | |
| 2006/0150530 A1* | 7/2006 | Davey | E04H 3/22 52/7 |
| 2007/0214729 A1 | 9/2007 | Moore | |
| 2007/0253057 A1* | 11/2007 | Potsaid | G02B 21/002 359/384 |
| 2009/0031642 A1 | 2/2009 | Donovan | |
| 2011/0007073 A1* | 1/2011 | Belt | G06T 15/20 345/426 |
| 2011/0075361 A1 | 3/2011 | Nakamichi et al. | |
| 2011/0122063 A1* | 5/2011 | Perlman | H04N 5/4403 345/161 |

FOREIGN PATENT DOCUMENTS

| | | |
|---|---|---|
| GB | 2391022 A | 1/2004 |
| WO | 2013004985 A1 | 1/2013 |

* cited by examiner

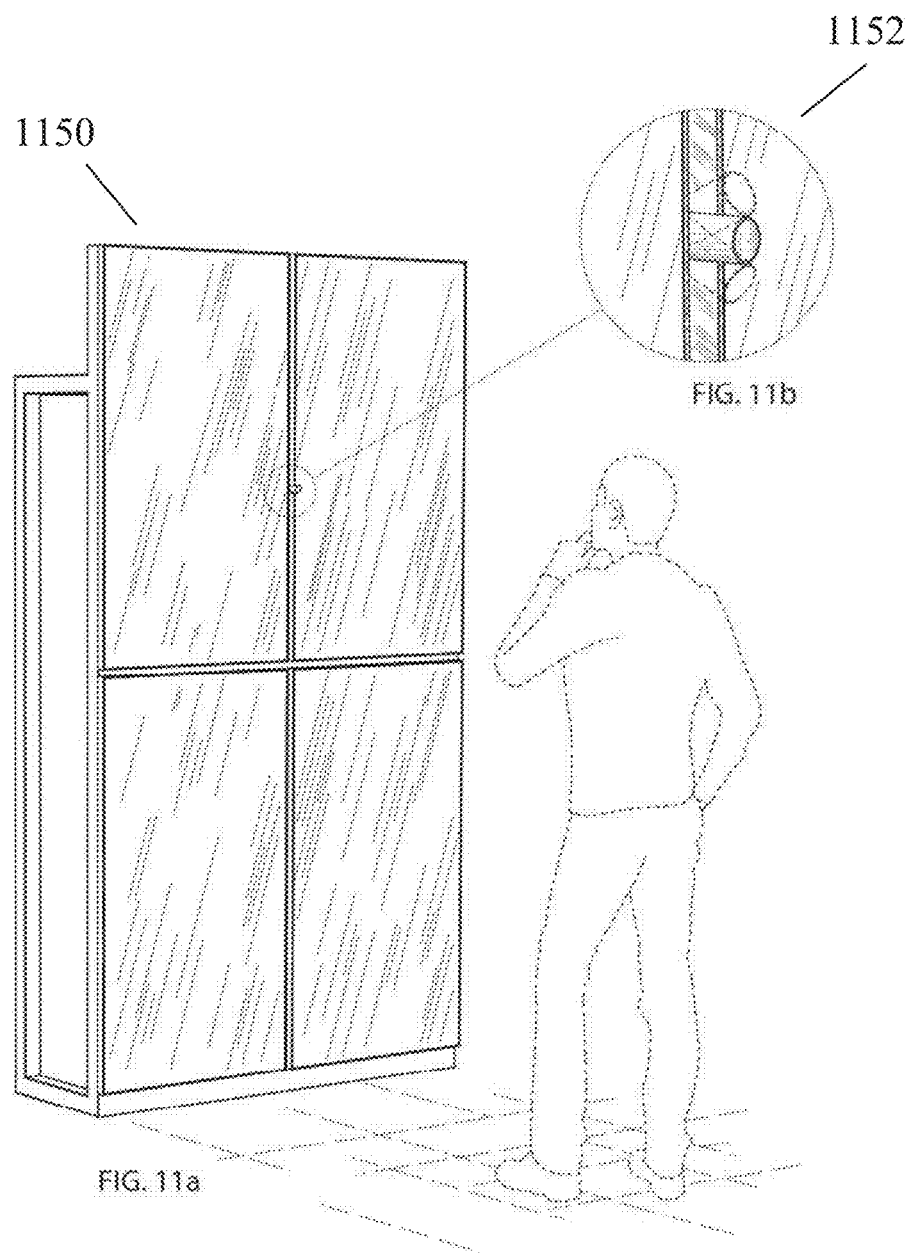

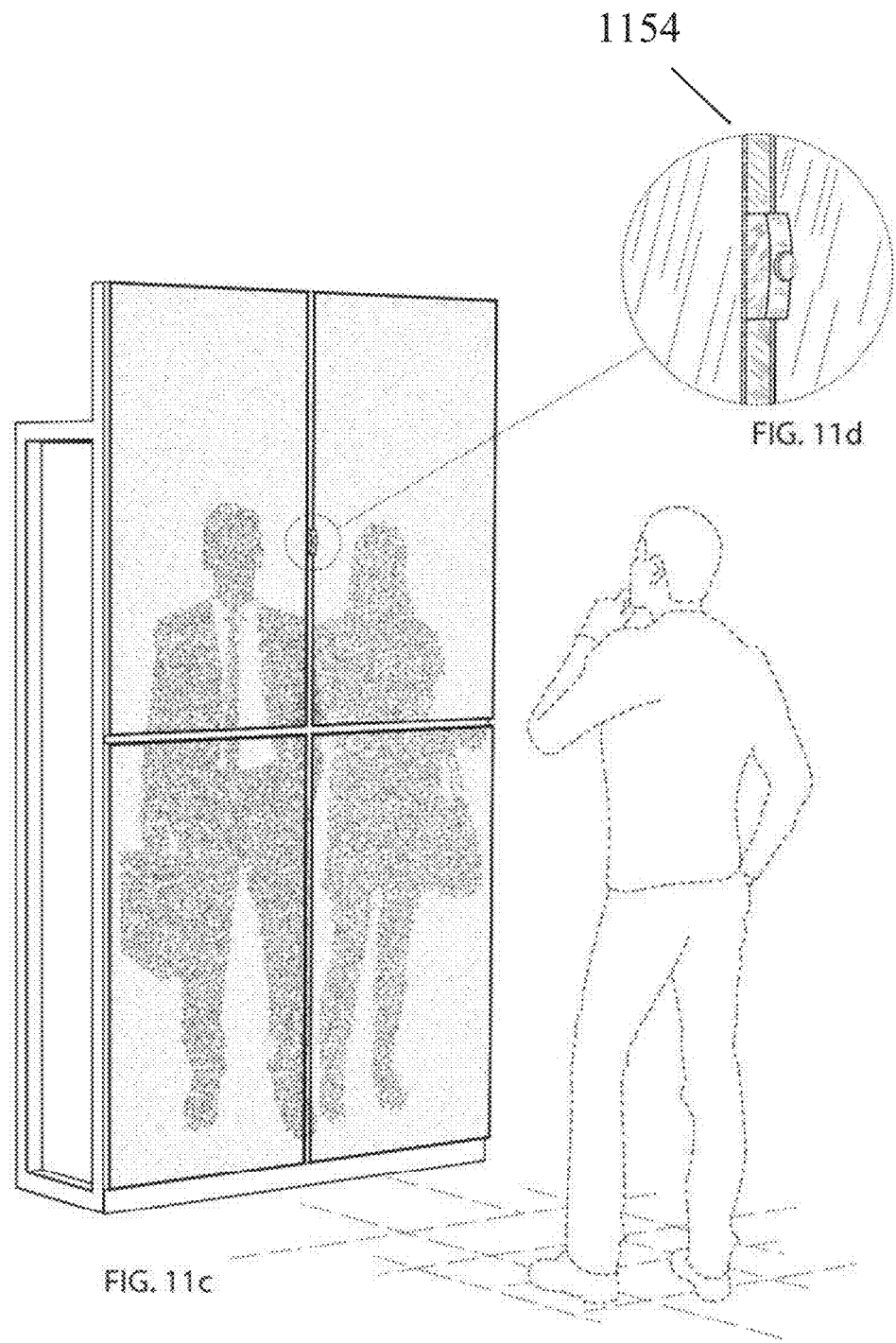

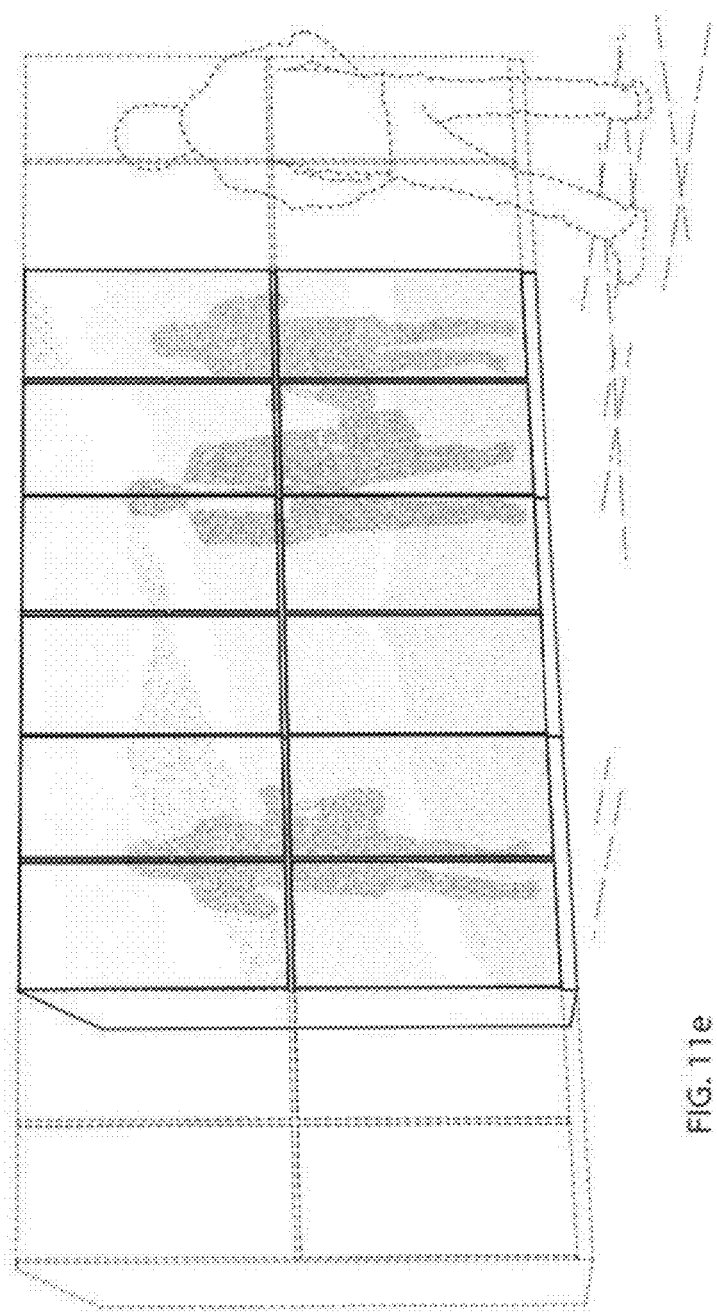

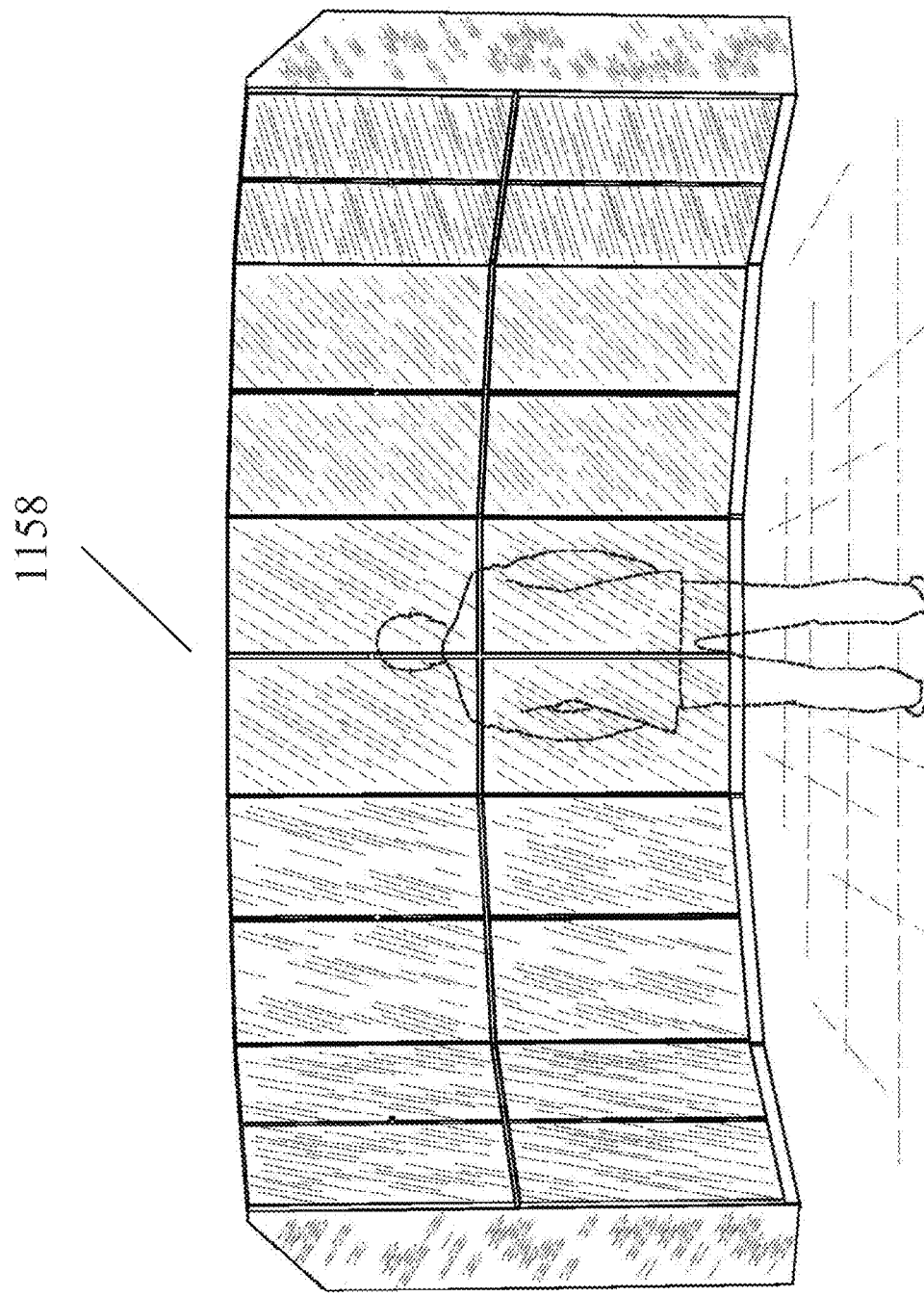

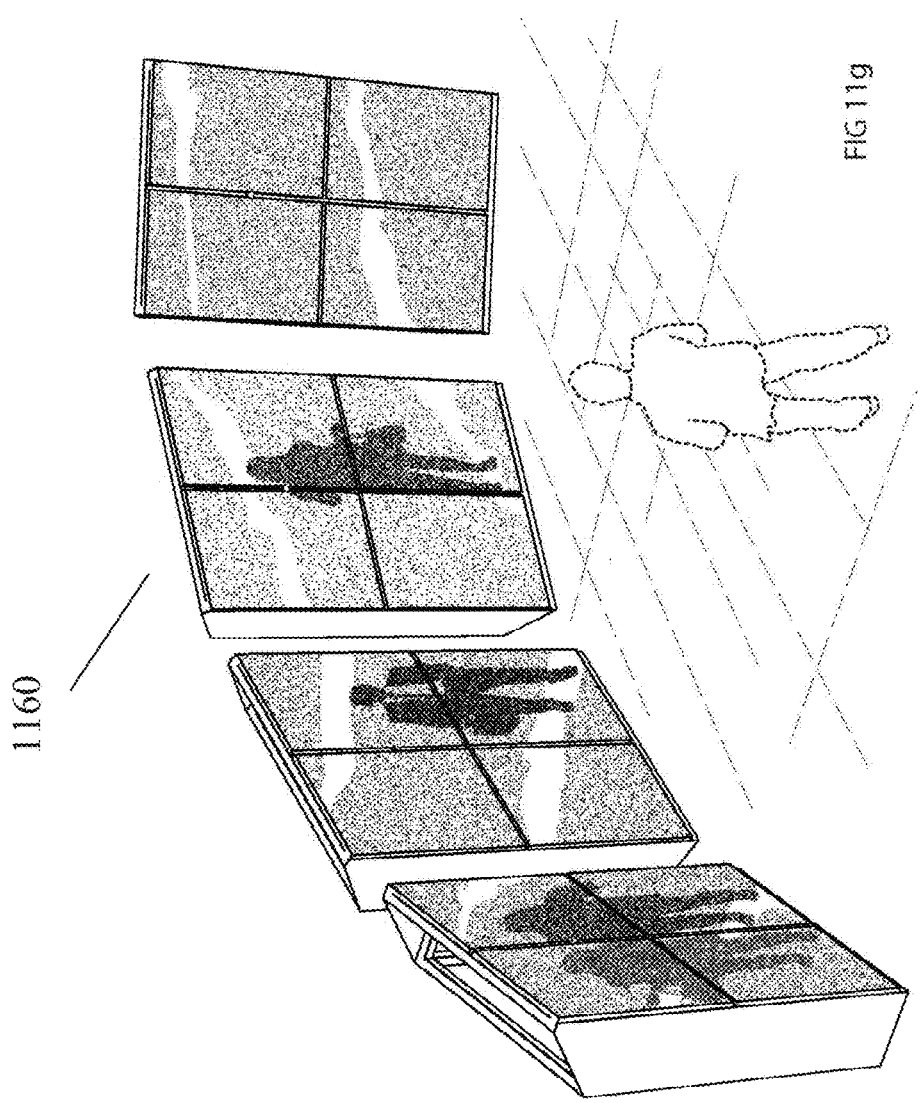

NETWORK ARCHITECTURE FOR IMMERSIVE AUDIO-VISUAL COMMUNICATIONS BY TEMPORARY COMMUNICATION STRUCTURES

The present application is a continuation-in-part of U.S. Non-Provisional patent application Ser. No. 14/807,847, entitled "Network Architecture for Immersive Audio-Visual Communications by Temporary Communication Structures," filed on Jul. 23, 2015, which claims priority from U.S. Provisional Patent Application No. 62/028,170, entitled "Network Architecture for Creating and Maintaining Temporary Communication Portal Facilities and Portal Facility Configurations," filed on Jul. 23, 2014, and U.S. Provisional Patent Application No. 62/042,342, entitled "Network Architecture for Creating and Maintaining Temporary Communication Portal Facilities and Portal Facility Configurations," and filed on Aug. 27, 2014, all of the applications in their entirety are expressly incorporated by reference herein for all purposes.

BACKGROUND OF THE INVENTION

Field of the Invention

This invention is directed to improving communication among people from remote locations, at low cost, by improved communication schemes, including portal structures configured to be mobile and easily deployed to remote locations for quick assembly and use, creating an audio-visual communication unit or facility that provides its users with an immersive, face-to-face, real-time, audio-video communication experience with eye contact, while speaking to others in remote locations anywhere in the world. The portal network architecture includes a plurality of portals located in different locations, the portals configured to define identical physical spaces, each configured with favorable lighting and camera configurations, for audio-video, immersive communication experiences among users of the portal structures. The portal structures may also incorporate other communication implementations, such as "channels" to facilitate bi-directional interaction with a distant landscape or persons and "phonos" to provide an unmediated aural link between different locations, enabling both real-time conversation and the transmission of ambient sounds. "Channels" and "phonos" communication implementations may either be used with the portal structures or on their own for specific applications, as desired.

BACKGROUND OF THE INVENTION

Conversing with new people online, especially across vast geographic or ideological divides, although desirable, is currently difficult for five primary reasons: (i) limited technological access available to many people in remote locations across the globe, (ii) mediocre recording, transmission, and presentation quality and capabilities through standard laptop or computer screens, (iii) language barriers, (iv) safety concerns and (v) expense concerns.

First, many communities in the world simply do not have easy access to the computing power, audio-video tools, electricity sources, and communication (e.g., Internet) connectivity available to industrialized countries, for example, the United States, to facilitate real-time audio-video connections. Second, even those who do have access to such connections generally operate at home or in offices, sitting down, and through relatively small display screens, for example, on desktops, laptops or their telephones or other mobile devices. For many, these communications are unsatisfactory, because of viewing distant and small images, resulting in a far less immersive or real experience than a face-to-face conversation. Third, language barriers for people in different regions of the world make conversations or communications across certain divisions exceedingly difficult or impossible. And, fourth, new connections made online with distant communities are often fraught with safety problems or obstacles, such as scams, viruses, lewd encounters, and surreptitious recordings.

Several types of "telepresence" videoconference systems have been proposed for implementing a virtual conference environment. The virtual conference environment, often implemented on desktops, aims to enhance personalization factors relating to the attendees. Virtual conferencing communications simulate the real experience of the attendees as much as possible, to improve the experience for the end users, and improve the equipment use ratio, return on investment, and general user satisfaction. While these "telepresence" systems, compared to traditional videoconference system, may offer a better experience, they come at an extremely high cost.

Other types of traditional videoconference systems and existing "telepresence" systems cannot facilitate eye contact between users due to visual disparity. By instinct, it is natural for a user to look at the opposite party on the screen rather than the camera, but the camera is usually not located at eye-level at the center of the screen, but is located off to the side of the screen or above it. Consequently, disparity exists between the picture photographed by the camera and the picture faced by the user, making direct eye contact impossible. In yet other types of "telepresence" systems, multiple cameras are used to collect images of multiple persons in a single location and to display them. These images are often spliced by use of expensive software and result in disparities that are noticeable.

For a number of reasons, only some of which are identified above, there is a continuing need for better, more immersive and direct solutions to connect the world. The network of portal structures or implementation of various types of individual portal structures addresses the difficulties identified above, and more, by using identical structures to improve the feeling of spatial and aural continuity in a manner that is relatively cheap, easily deployable, and broadly accessible.

BRIEF SUMMARY OF THE INVENTION

This invention allows for easy, rapid, global deployment of portals structures that serve as meeting rooms for persons who can engage in communications with others located in remote locations, sharing an immersive experience that simulates face-to-face conversation of life-size figures. The persons may be those engaging in business, collaborating creatively, or absolute strangers who wish to communicate with others across the globe. These portals are configured to be quickly assembled, at low cost, anywhere, even outdoors, and in public centers or areas. The portals define identical spaces (fully or substantially), with interiors of the portal structures that are easily assembled, in remote locations, to create an audio-visual communication unit that provides its users with an immersive communication experience as if they are conversing across each other in the same room. The portal communication structure provides images that simulate the size of a real person, smooth and fluid motion, precise gestures, video, lighting, audio, eye contact and communication with eye contact among a large user group in an immersive environment, which makes the users or attendees feel as if they are present in the same conference site or forum.

In accordance with one embodiment of the present invention, a plurality of portals may be located and connected to others via communication networks to create a network of portals assembled at remote locations around the world, to serve as temporary communication structures. Any of the portals may be moved to another different location with ease. Each of the portals in the network is configured virtually identically, ensuring consistency of experience at different sites or locations and creating the feeling as if the space they are in is continuing seamlessly through cyberspace.

The portals are constructed to define substantially or fully identical interior structures, which is critical to creating the immersive experience at either end for the attendees. In some embodiments, the camera configuration is concealed from view, reducing visibility and the impact on the users, heightening or enhancing the feeling of being in the same room as someone in the other portal.

The images collected in each portal structure and transmitted to another portal structure are displayed on a single, large, flat screen, sized sufficiently to display life-size figures of the users. In some embodiments, the cameras are strategically located with camera lens oriented at predetermined angles, with favorable lighting to accomplish the immersive effect at low cost. In some embodiments, the portal system creates a realistic image of another person on a screen by locating a camera in a fixed location, using a flat focal plane to create a 2D image of the person within a context of the rear of the portal structure, which is then projected onto the flat screen. To create eye contact, the camera is placed near the location of the eye of the subject to provide the illusion that the observer is looking directly into the eye of the subject and vice versa. In accordance with one approach, the portal system uses a camera lens with a wide enough field of view for the object and the camera is titled down until the object is centered on the camera sensor. The portal system collects the image from the perspective of the camera and then projects it onto the flat plane or flat screen before the observer.

In some embodiments, the portal system reduces distortion of the images by using an HD format 16:9 camera on its side. In some embodiments, the portal system further removes perspective distortion by using a camera lens designed for an even wider field of view, placing it at eye level, and shifting the lens with respect to the camera sensor down by several millimeters to correct perspective distortions. In some embodiments, the portal system further uses a lens that is small, has proper relative illumination and minimum distortion. The field of view required for the lens is further limited by both tilting the lens and the detector or camera sensor downward, but allowing the lens groups to tilt and decenter with respect to each other as well. In this way, the portal system flattens the field of view and minimizes distortion at the bottom of the field of view.

Advantageously, the portal structures improve the depth presence of the life-like figure projected on the single screen, eliminating multiple camera views spliced together to provide a panoramic view. The lighting illuminates the figure, so the focus is on the figure and the background is relatively dark. With the favorable lighting, although the images projected are essentially two-dimensional (2D) images that are planar images only, the lighting contrast between the figure and the background creates the depth in the scene of the opposite party. The projection of images on the single screen provides a seamless display, without use of multiple, large-sized flat televisions, either Liquid Crystal Display (LCD) or Plasma Display Panel (PDP), to present images in a combined way, which fail to provide an immersive experience resulting from television bevels that obstruct display of a continuous image. The present portal structure enhances eye contact and gaze perception, which is an important non-lingual mode of communication critical to creating the perception that the two speakers are in the same room. Gaze perception provides many communication foundations such as feedback, dialog mode, and emotion expression, and is a key factor in perceiving the thoughts of the opposite party. Eye contact between the two parties is effectively enabled because of the unique camera arrangement relative to the screen in the portal. Unlike most audio-video teleconferencing efforts, which have focused on enhancing or maximizing the quality of recording and transmission within the confines of a home or office setting, this invention readily deploys such technologies in outdoor, public spaces through a carefully conceptualized and constructed structure that provides numerous technological, logistical, aesthetic and pragmatic solutions including how to secure technological items during shipment, how to control and maintain the climate of the interior of the portal structure and how to create an easy, plug-and-play, set-up process for the receiving party. It should be recognized that unlike other attempts at creating conference rooms, the portal structures in accordance with this invention enable secure, easily deployable distribution of these portal structures across the world.

In accordance with some aspects of this invention, the portal structures are provided in a kit of parts that come in a shipping container and may be easily assembled and installed on site (in any remote location). Once power and internet are plugged in and the components are assembled as described, the portals are ready to use by anyone.

In some embodiments, other communication schemes may be used with the portal structures (within the interior spaces or outside) or without. These include "channels" implementations, which facilitate viewing of landscape from a distance and "phonos" implementations, which provide an unmediated aural link between different locations, enabling both real-time conversation and the transmission of ambient sounds.

In some embodiments, the invention is directed to a system for enhancing immersive audio-visual communications among at least a subject and an observer at two separate, remote locations, comprising at least two portal structures configured to define substantially identical interior spaces at the two separate, remote locations, and coupled by a communication network. The system includes a 2D flat screen at one end of each of the at least two portal structures and a camera configuration within a first one of the identical interior spaces configured to capture the image of the subject and transmit the image to the second one of the identical interior spaces. The system also includes a projector at the second one of the identical interior spaces configured to project a life-size version of the image for display on the 2D flat screen before an observer within the second one of the identical interior spaces and audio-visual communication interface between the subject and the observer, by creating an illusion of spatial continuity for creating the immersive experience.

BRIEF DESCRIPTION OF THE DRAWINGS

The present invention and specification is illustrated by way of example, and not by way of limitation in the figures of the accompanying drawings in which like reference numerals are used to refer to similar elements.

FIG. 6 also illustrates the same resulting image with a compressed appearance resulting from this particular camera configuration.

FIG. 11a is a front and side perspective view of a video wall or "channel" configuration in accordance with some embodiments of the present invention illustrating a particular camera configuration.

FIG. 11b is a side perspective view of the camera configuration illustrated in FIG. 11a, placed in the bezel of the video wall or "channel," illustrating the camera in various orientations.

FIG. 11c is a front and side perspective view of a video wall or "channel," configuration in accordance with the present invention, illustrating another type of camera configuration.

FIG. 11d is a side perspective view of the camera in FIG. 11c configured in the bezel of the video wall or "channel."

FIG. 11e is a front perspective view of a linear assembly of continuous video walls or "channels" in accordance with some embodiments the present invention.

FIG. 11f is a front perspective view of a curved assembly of continuous video walls or "channels" in accordance with the some embodiments of the present invention.

FIG. 11g is a front perspective view of a curved assembly of video walls or "channels" that are separated from each other.

DETAILED DESCRIPTION OF THE INVENTION

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

Figure 1:
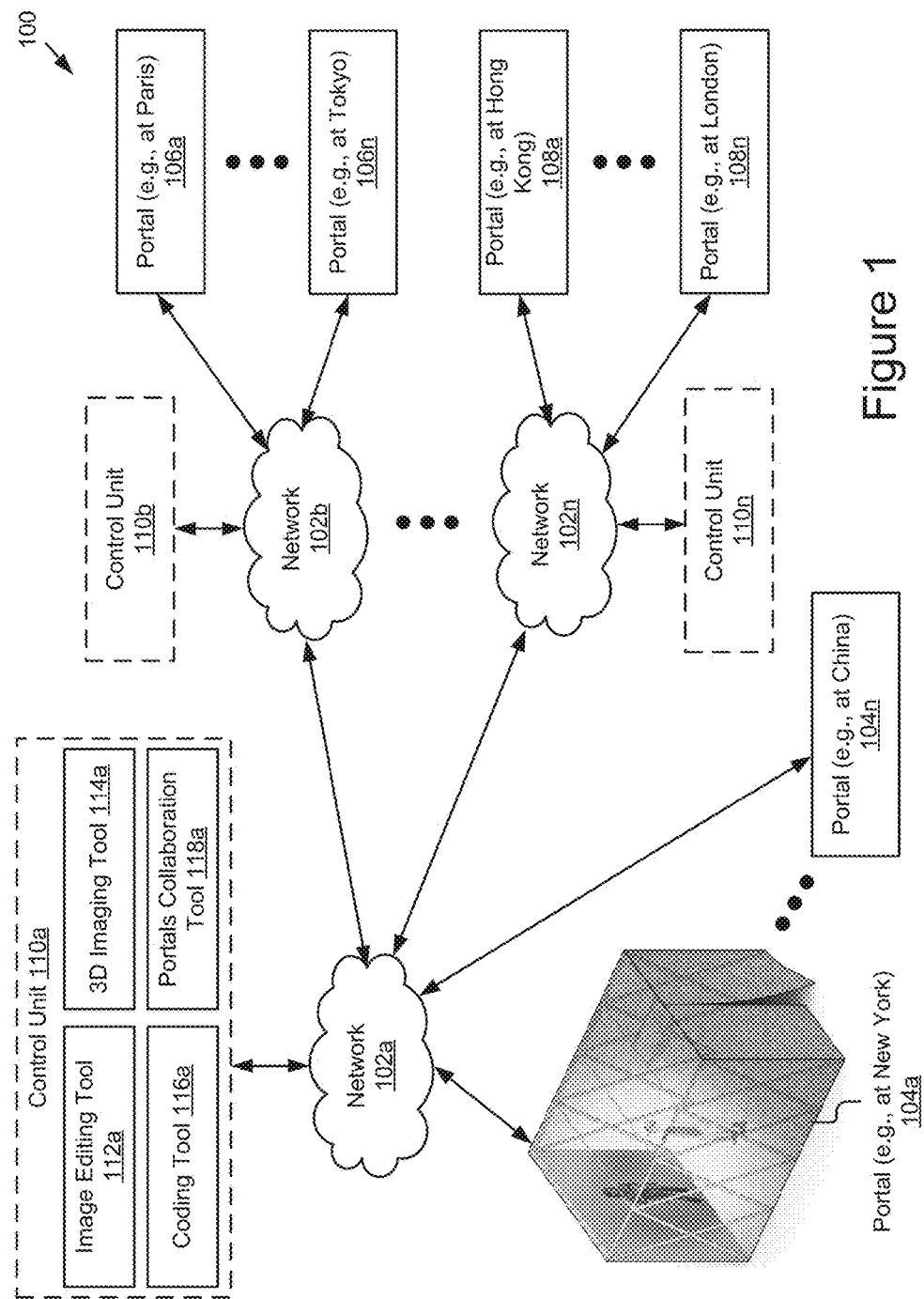
FIG. 1 is a block diagram illustrating an example portal network architecture with a plurality of portal structures that may be easily assembled at remote locations, serving as temporary communication sites, to provide users with an immersive, audio-visual communication experience, at low-cost, and with improved lighting and camera configuration for realistic image capture and transmission.

Referring now to FIG. 1, architecture for a network of temporary portals 100, each configured to be assembled and disassembled quickly at a desired location is illustrated. The network of temporary portal structures are interconnected physical products that define physical uniform spaces that are substantially identical to create optical and acoustic illusions of spatial and aural continuity between at least two disparate locations. The portal structures, for example 104a-104n, 106a-106n, 108a-108n, are supported by a swappable, back-end system configured to facilitate bidirectional pairing and repairing of the products (via communication networks 102a, 102b through 102n). The portal structures are designed as audio-video "telepresence" booths providing life-size presentations of a distant individual and aural continuity that facilitates real-time conversation with overlaid text translation or aural translation. Portals 104a through 104n (as well as the others illustrated) can be easily assembled on site. In some embodiments, schematics or specially designed pop-up skeletons may be provided. Alternatively, a kit to create the portal structure may be dispatched to the remote locations where they are to be assembled. It should be understood that the particular designs for the portal structures may be changed, adapted, modified, or customized, based on use, application, or desire for their intended purpose and use. The portal structures 104a through 104n may display advertising, company logos, or other visual indicia as desired on their exterior walls. Different technologies, adapted for particular applications or modified, than the ones disclosed here may also be incorporated. The portal structures 104, 106, and 108 should have key elements placed in identical locations within the interior of each unit to create the illusions of spatial continuity through interconnected network (one or more that are illustrated).

The network of portals 100 and portal structures 104, 106, and 108 are a distinct improvement over existing solutions because they provide low-cost virtual spaces, with projection of life-size images that may be either standing or sitting, with true, direct eye contact unlike traditional webcam-computer setups. Advantageously, these portal structures may be easily assembled, by lay persons, who can follow instructions.

Because of its low cost, the network of portals 100 enables the creation of a wide, interoperable network that can facilitate conversation, collaboration, product or service demonstrations, education initiatives, health-based interventions, reporting on human rights from distant locations, customized interconnected immersive environments and so on. In addition, these portal structures 104, 106, and 108 may be used for video gaming, providing video games at different locations, uniform engagement with the screen surface, and sharing a virtual space, as if to simulate that several players are playing in the same virtual space. Advantageously, the portal structures 104, 106, 108 are configured for communication by any network, including internet and satellite networks. They may be powered by electricity or solar options.

The portal structure 104, 106, 108 includes a new camera and lens configuration, which replaces standard webcams that have been optimized for horizontal and warped coverage (on laptops and boardrooms). The new camera and lens configuration, in combination with projectors or large screen surfaces, creates the more immersive, shared experiences.

The example portal network architecture, illustrated generally at 100, includes a plurality of portal structures, one of which at location A (e.g., New York) is illustrated in greater detail. The portal structure 104a, which may be constructed as illustrated or differently for easy transportation and assembly to define an interior space of predetermined size. In one embodiment, the portal structure may be a shipping container. In yet another embodiment, the portal structure may have a "pop-up" design, which would enable anyone to create the portal in a room or outdoors in a matter of a short time (e.g., minutes). Details of the portal structure assembly will be described later. The architecture 100 is a collaborative network, which provides anyone the opportunity of using a portal and plugging into an online network (illustrated by networks 102a, 102b through 102n). In one embodiment, the collaborative network may be a cloud-based environment (curated by third parties or not) with cloud-based applications that enable collaborative audio and video editing, coding, 3D imaging, etc. In this collaborative network, the portals 104, 106, and 108 serve as a space into which people may enter, to collaborate in a high-quality, uniform environment with direct access to the cloud. This direct access is critical in regions with low-bandwidth transmission and for real-time online collaboration. Users may go online later to edit and promote materials with colleagues.

The network 102 may be a conventional type, wired or wireless, and may have numerous different configurations including a star configuration, token ring configuration or other configurations. Furthermore, the network 102 may include a local area network (LAN), a wide area network (WAN) (e.g., the Internet), and/or other interconnected data paths across which multiple devices may communicate. In some embodiments, the network 102 may be a peer-to-peer network. The network 102a-n may also be coupled to or include portions of a telecommunications network for sending data in a variety of different communication protocols. In some other embodiments, the network 102 includes Bluetooth communication networks or a cellular communications network for sending and receiving data including via short messaging service (SMS), multimedia messaging service (MMS), hypertext transfer protocol (HTTP), direct data connection, WAP, email, etc. In addition, although FIG. 1 illustrates a network 102 coupled to the portals 104, 106, and 108; in practice one or more networks 102 may be connected to these entities.

FIG. 1 further illustrates a control unit illustrated by reference numerals 110a, 110b, through 110n. In some embodiments of the portal network architecture, these control units may be configured to manage or control operations of the portals 104, 106, and 108, as they are widely distributed and located across the globe. A control unit 110a may be configured to control portals, by region, or by other criteria, for example telecommunication carrier collaborations. As illustrated, the control unit 110a is connected by network 102a to portals 104a through 104n. Similarly, a control unit 110b is illustrated as coupled to portals 106a through 106n by network 102b. Control unit 110n is coupled to portals 108a through 108n through network 102n. The control unit 110a may be a hardware server including a processor, a memory and network communication capabilities. The control unit 110a is communicatively coupled to the network 102, via a bi-directional signal line. In some embodiments, the control unit server 102 sends and receives data to and from one or more of the portals 104, 106, and 108, via the network 102. The control unit server 102 may track portal structures that are active. In some embodiments, the control unit server 102 may track the process of deployment of the portal structures, track inventory, requests etc. In some embodiments, the control unit 110 may include an image editing tool 112a, a 3D Imaging tool 114a, a coding tool 116a, and a portals collaboration tool 118.

In some embodiments, the image editing tool 112a provides editing tools that enable a user to modify a 2-D image, e.g., a digital photograph image. Typical editing tools include a selection tool for selecting a region or object in the image, a copy tool to copy selected objects, a paste tool to paste an object copied from the image or an external object (e.g., an object copied from another image source) into the image, and image modification tools that enable the user to change the color, shape, size, or proportion of a selected object. Editing tools for 2-D images operate in the plane of the image because the image editing applications operate on the assumption that the image is coplanar to the camera's focal plane. However, the image may contain elements that are 2-D representations of three-dimensional (3-D) objects and have a perspective that affects their appearance based on their distance from the camera. The editing tools do not account for the perspective, which can make regions of the image having perspective challenging to edit. The image editing tool 112a also provides techniques to provide a perspective editing tool for performing edits in regions of an image having perspective. The perspective editing tool enables the user to identify one or more regions in a 2-D image having perspective, i.e., perspective areas. The user can perform various editing operations on an object such that the edited object conforms to the perspective of the perspective area. The 3D imaging tool 114a may include photo-editing software that allows users to create 3D manipulations to illuminate the hidden areas of an image. The coding tool 116a may include various coding mechanisms known to those skilled in the art to implement and execute additional functionalities and a portals collaboration tool 118 may include interfaces for various users to collaborate and meet in virtual forums.

Figure 2:
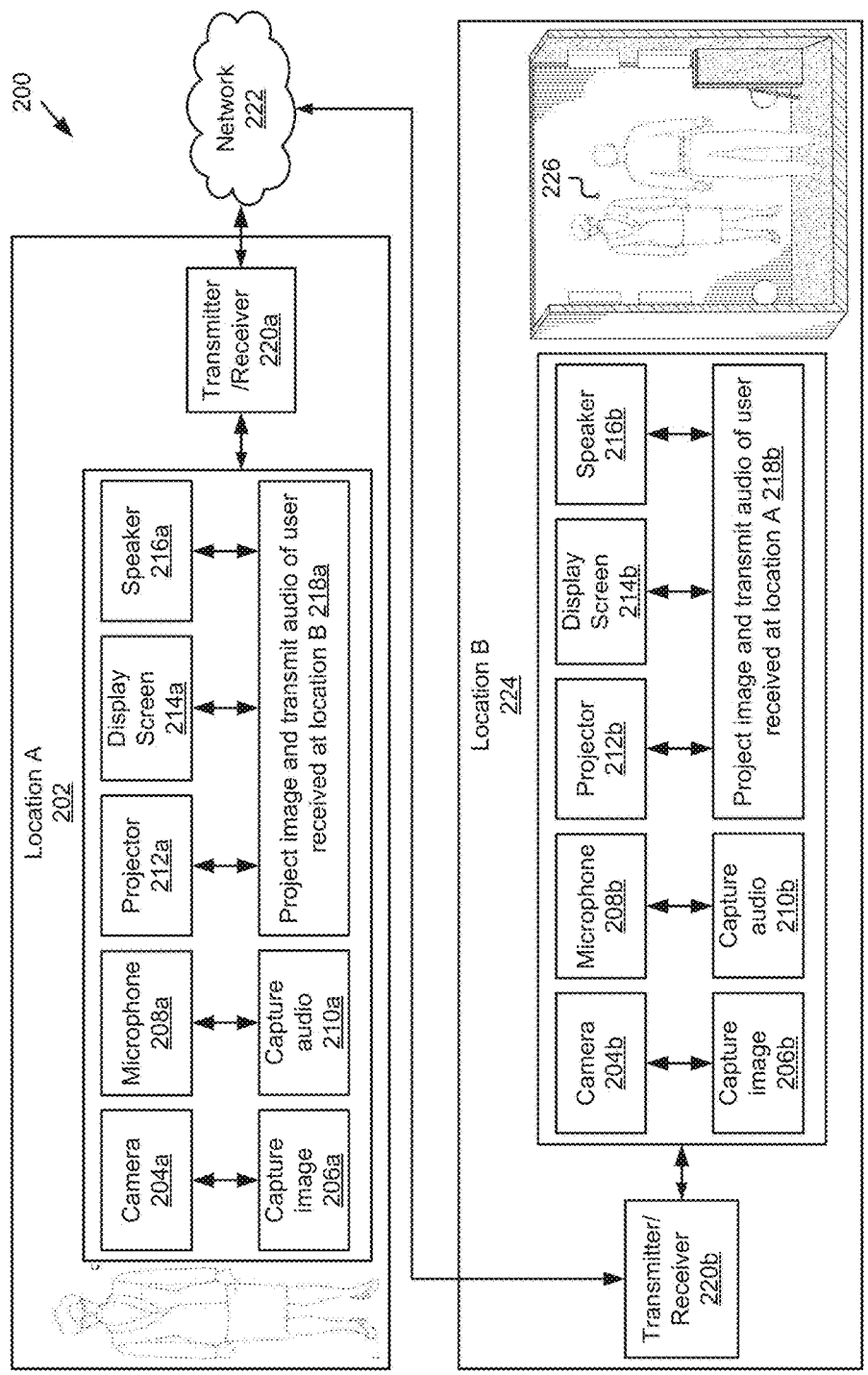
FIG. 2 is a block diagram illustrating example hardware components and their arrangement within an example interior space of a portal structure at either end of a portal network architecture; the plurality of portal structures defining identical (fully or substantially) interior spaces, which is critical to the immersive experience.

Referring now to FIG. 2, the portal structure at locations A and B are illustrated generally by reference numeral 220. The portal structure at example location A, indicated by reference numeral 202 illustrates a female figure (in broken lines). The portal structure 202 includes a transmitter/receiver 220a, in communication with a camera 204a, a microphone 208a, a projector 212a, a display screen 214a, a speaker 216a, a capture image unit 206a, a capture audio unit 210a, a module 218a that projects images and transmits audio of the user received at location B. The portal structure 224 at location B includes similar components to accomplish the same functionalities and operations at location B. The portal structure 224 includes a Transmitter/Receiver 220b coupled and in communication with a camera 204b, a microphone 208b, a projector 212b, a display screen 214b, a speaker 216b, a capture image unit 206b, a capture audio unit 210b, a module 218b that projects image and transmits audio of the user received at location B. The person (male figure illustrated in broken lines) within the portal structure 224 at location B views the female figure from location A, as both stand face-to-face sharing an immersive experience, as if in the same room engaged in conversation. The communications are transmitted via a network 222. In operation, the camera 204a at location A, located behind the flat screen (display screen 214a) in the portal at location A captures image data of the subject at location A (the female figure) via the tiny hole in the flat screen (display screen 214a), and transmits that image data to location A, which is received by the receiver 220b. The image data is projected by the projector 212b at location B on the flat screen (display screen 214b) of the portal at location B, so the observer (the male figure) views the subject (the female figure) within the interior space of the portal at location B, experiencing the sensation that she is in the same room as him. The camera 204b behind the flat screen (display screen 214b) in the portal at location B, via the tiny hole 226 captures image data of the man (in this instance the subject) and transmits the image data via the transmitter 220b to the receiver 220a within the portal at location A and that image data is projected by the projector 212a on the flat screen of the portal at location A for the female figure to see (in this instance, she is now the observer). The microphones 208a and 208b at either end with the speakers 216a and 216b, capture the audio (by audio capture units 210a and 210b). In some embodiments, the subject may be located anywhere between 5-20 feet from the flat screen.

In some embodiments, the portals at locations A and B may be immersive portals configured to provide pre-recorded encounters with others. In such instances, the subject may be represented by pre-recorded images. In some embodiment the display screens, either of 214a or 214b may be used a video wall to display the channels implementations or projections of landscape or scenes for viewing by those facing the screen. The portal structures in these instances may be configured to provide a venue for an audience. In some examples, the video walls for channels may be used on the side of buildings. These may be LCD screens configured to broadcast live feeds from another area this is perspectively continuous. The portal structures may be configured as interconnected amphitheaters providing shared music or performance experiences. The portal structures may be used for other shared experiences, for example, musical band performances, art exhibits, telemedicine, shared playgrounds, shared classrooms, shared conference rooms, and a myriad other applications requiring real-time, live, communications that feel like immersive experiences where all the attendees are in the same space.

Figure 3:
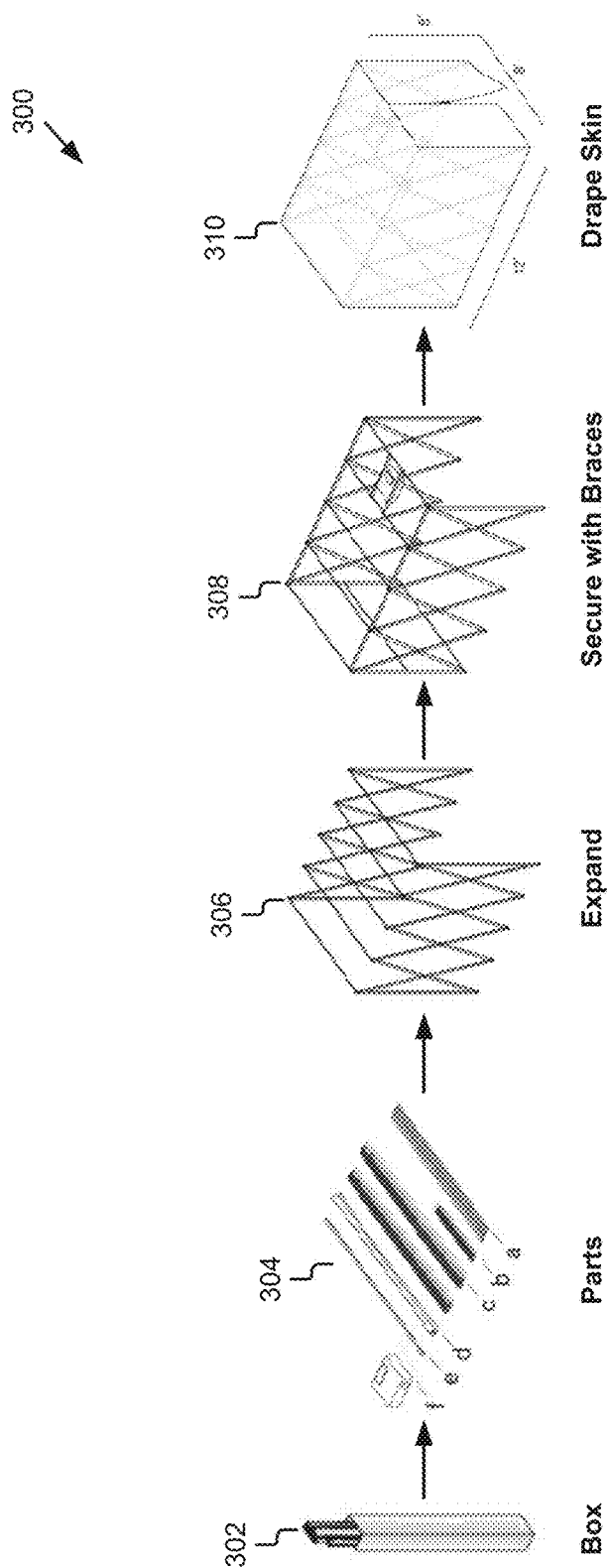
FIG. 3 is a graphic illustration of an example portal structure in accordance with one embodiment, configured for ease of transportation and assembly that may be packaged in a box.

Referring now to FIG. 3, one embodiment of the portal structure is illustrated. As illustrated and indicated by reference numeral 302, the portal structure may be packaged in a box-like packaging. This packaging or box may be easily disassembled as illustrated by reference numeral 304, to reveal its various parts (a, b, c, d, e, and f). Each of the parts may be numbered or labeled to identify the various components or parts and may be provided with instructions for assembly. The portal structure 306 may be expanded, as illustrated by reference numeral 306, and secured with braces, and finally as indicated by reference numeral 310, the structure may be draped with the skin or covering to construct the unit.

Figure 4A:
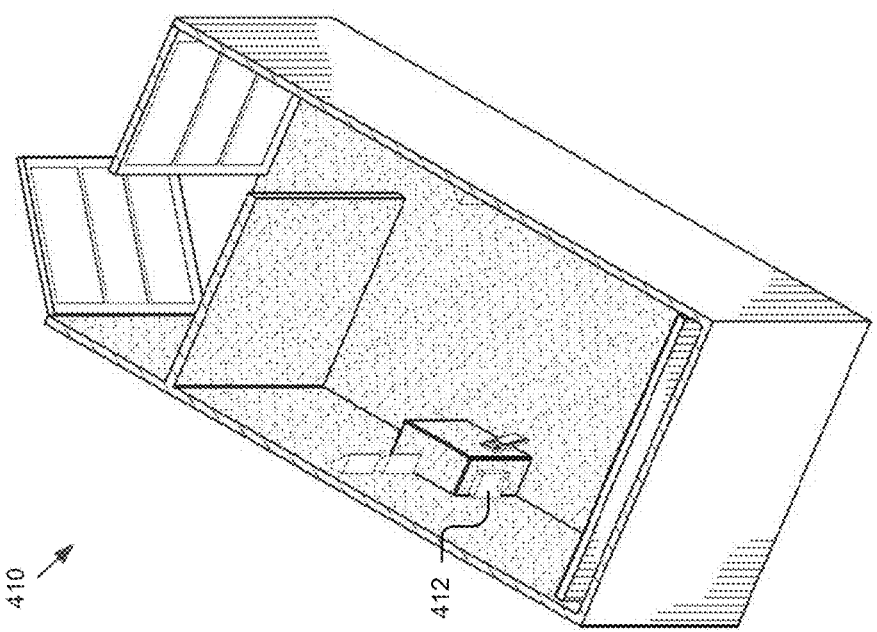
FIG. 4A is a graphic illustration of another example portal structure illustrating the interior space with the projection screen and lighting placement. The portal structure is conveniently constructed from a shipping container.
Figure 4B:
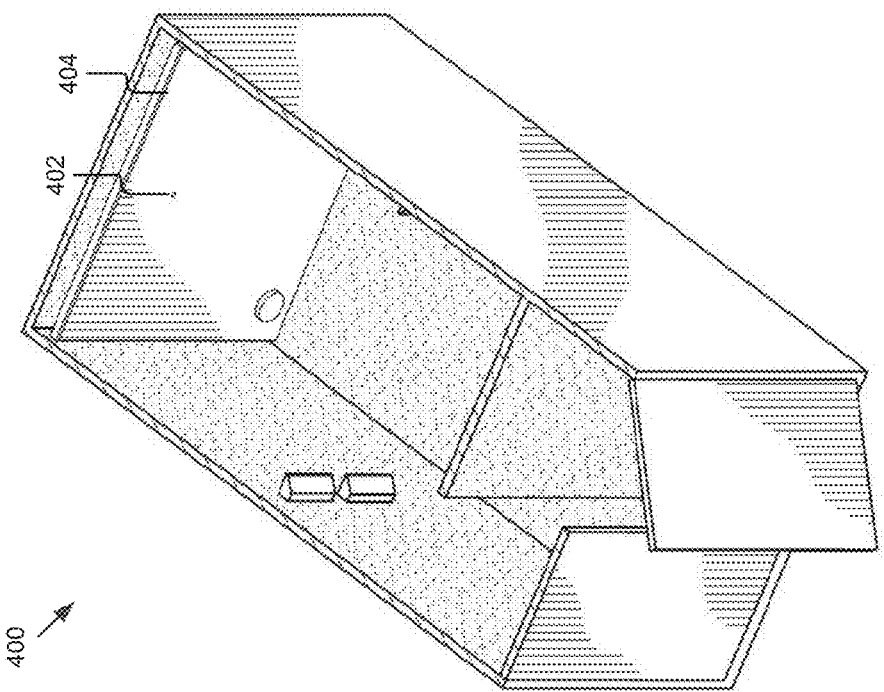
FIG. 4B is a graphic illustration of another view of the example portal structure shown in FIG. 4A showing the projector placement.
Figure 4C:
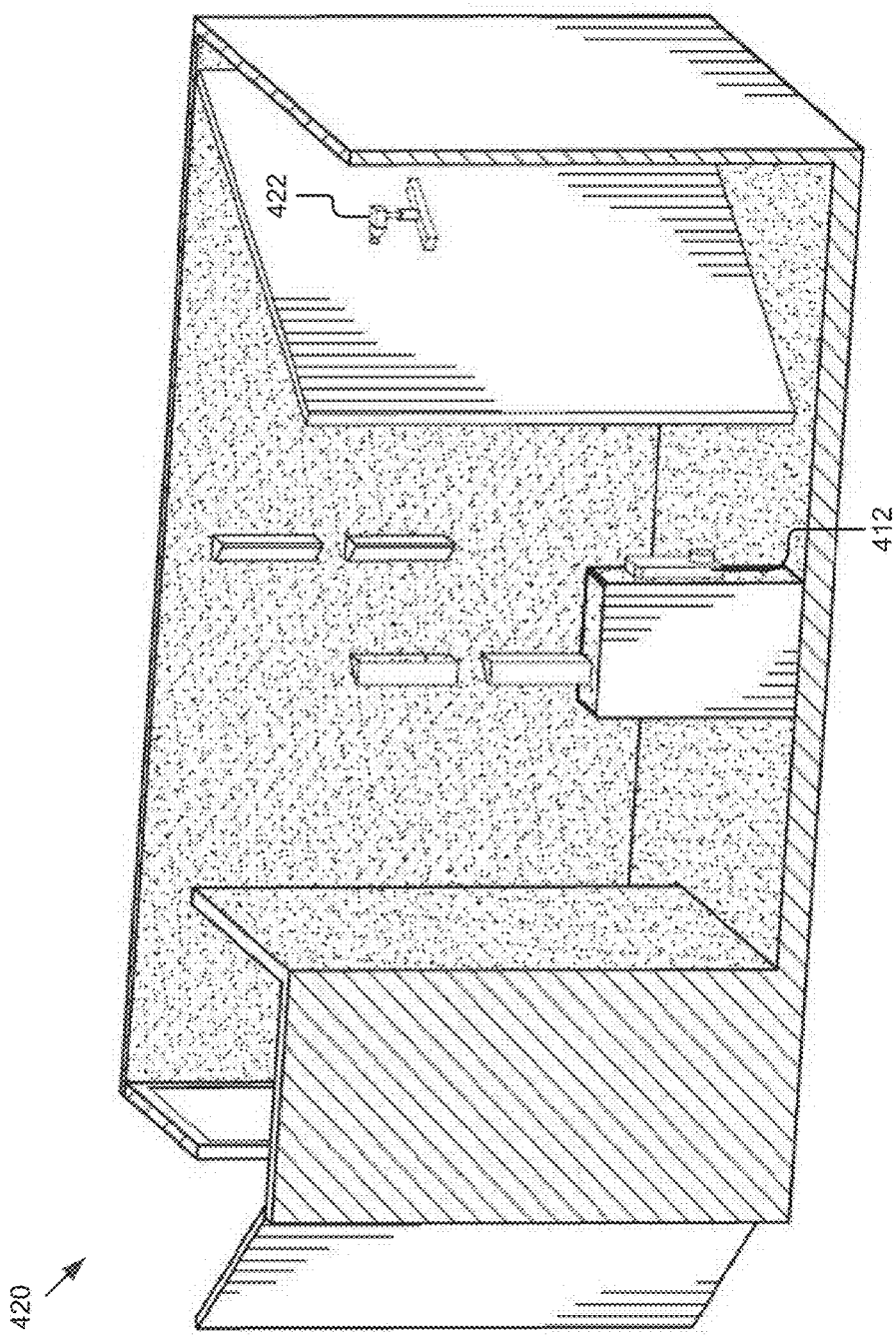
FIG. 4C is a graphic illustration of yet another view of the example portal structure illustrating the interior space of the portal structure with the arrangement of all the communication components including the camera hardware behind the flat screen, essential to the immersive experience, the projector and lighting facing the flat screen.

Referring now to FIGS. 4A, 4B, and 4C, in some implementations, to create the portal structures, for example, as illustrated by reference numerals 400, 410, and 420, the following components may be used.

1. Modified shipping container (400, 410, and 420) with acoustic insulation, dry wall and carpeting.

2. Ultra short throw projector (e.g., 412 in FIG. 4B, for virtually eliminating glare and shadow interference, while displaying up to 100-inch images from as little as 12 inches away, these are ideal for wall-installations); they can also be polarized, along with the camera lens, to further reduce projector glare.
3. Speakers
4. Video camera and microphone (e.g., 422 in FIG. 4C)
5. LED lighting (e.g., as shown on the side walls of the portals)
6. Climate control unit
7. Computer with Internet connection (to establish communication with another portal site)
8. Foam packing that turns into outdoor furniture Example portal structures (400, 410, 420) may be configured by using, for example, a shipping container. The shipping container is insulated, dry-walled and carpeted on the inside to secure the interior space, improve acoustics, and create an aesthetically pleasing, uniform environment between portals. In some embodiments, a customized fabric is stretched across the interior and expanded out into the interior serving as an immersive screen at one end and an external canopy on the other (in some embodiments). A short throw or ultra-short throw projector (412 in FIG. 4B) is used to project a full, floor-to-ceiling, image of the individual in the other container (the other portal structure) to create the illusion that the two exist together in one continuous space. As illustrated, the speakers are set behind the screen 404 (FIG. 4A) to give the impression that the sound is coming directly from the individual in the other container. Other acoustic arrangements position speaker and microphone overhead, midway between the screen and the speaker, so as to create the feeling that the sound is coming from the person in the other portal location. The video camera is set up just in front of the screen or right behind it, concealed and unobtrusive, to enhance the feeling of being in an unmediated, shared and immersive space. The camera is generally less than 1 inch in diameter so as to minimize obtrusiveness. In some embodiments, LED lighting exists behind the fabric on the ceiling, creating a glowing effect that brightens upon approach to the interior space. The lighting serves to encourage entry into the portal structure. In some embodiments, additional components may include a climate-control module, for heating or cooling the interior space, or 3D spatial scanners to enable participants to affect the projected image with their movements. The portal modules are configured to be easily transported and for use with a laptop with Internet connectivity, a desktop, or in some iterations, a smartphone. For moving from one location to another, the equipment is installed tightly in place. Additional foam-based furniture can be used to tightly pack the interior of the container so that none of the above items break in transit; this foam furniture can be easily unpacked on site and may be used for seating outside the portal structures, as desired.

The portal structures (400, 410, 420 in FIGS. 4A, 4B, and 4C and 300 in FIG. 3) are easy to assemble and construct and deconstruct. When made out of tent-based fabrics, they can be shipping easily to their destination and built on site. In order to secure the portal structure equipment overnight, the shipping container portal structure is sometimes preferable. These containers can be transported by ship and truck to their final destinations. In a further embodiment, the portal structure can be built into the back of a box-truck and driven from one location to another. In all of these cases, the portal structure can be moved from one location to another and erected on myriad surfaces. The surfaces may be any of gravel, stone, grass or pavement. Once on site, each of the portals structures can be easily set up. For example, the portal structure 300 in FIG. 3 opens up as a kit of parts. The portal structures preferably use LED lighting, for their efficiency and soft illumination. In addition, LED bulbs draw very little power and are also supported by solar power. All portal structures can be run on 1 or 2 120-volt power outlets, making them relatively low power draws. In some embodiments, at night, or whenever the portal structures are not in use, the truck or container door can be shut and locked to prevent against theft.

To make a simple portal structure (400, 410, 420, in FIGS. 4A, 4B, and 4C) from just a shipping container or the like, a hole is drilled in the container to allow power and Ethernet cords and heat from a climate control unit to escape. The subsequent steps involve installing a wood frame and wrapping that with a carpet or fabric to increase acoustic quality.

Although the basic and key elements to create a simple portal structure (400, 410, 420) may be to use a shipping container, an ultra short-throw projector 412, video camera, speakers, laptop and encasing fabric, the audio-video conferencing technology itself may be modified to incorporate technical components that are more updated or customized by application.

Portal structures (400, 410, 420 in FIGS. 4A, 4B, and 4C and 300 in FIG. 3) may also be constructed indoors if desired. The main elements and components remain the same—the screen, technology, and core dimensions. The indoor construction of this parallel space would allow people in particularly hostile climates or without exterior space to join the portals network. Portal structures (400, 410, 420 in FIGS. 4A, 4B, and 4C and 300 in FIG. 3) may be set up in a public, outdoor space and open to public use. The portal structure offers an accessible, immersive and safe communication option for people in public spaces to connect across barriers of all kinds, including language, to others across the world.

In some embodiments or applications, initial pairing within the portals network may be easily switched at later points in time as the network grows and expands. One month, one portal structure may connect to Accra, Ghana, and the next, to Dayton, Ohio. In some implementations, the portal network architecture may facilitate multiple connections to various different locations (Accra, Ghana, and Dayton, Ohio) for use by more than one user concurrently. A central controller (comprising computers and processors in a distributed architecture, e.g. control units 110 in FIG. 1, described above) located at key locations in the world may be configured to automatically determine when the portals are active (i.e., set up and operational). In some implementations, upon determining that portals are active, audio-video communication requests by others to users at the portals may be routed or messages conveyed to them. The central controller or control unit 110 may inform or convey messages of general interest via the portals (news feed etc.). The central controller or control unit 110 may facilitate myriad other telecommunication features.

In some applications, the portal network architecture may be used to record performances across locations and/or present such performances live (e.g. a concert to facilitate remote participation). It may be used to provide live reports from disaster-stricken areas or to monitor areas with endemic human rights abuses, such as refugee camps. It may be used to convey or extract specialized knowledge in remote areas; to provide job-related or other educational training; to assist companies in marketing by connecting purchasers to the people at the source of production, for entertainment by movie companies offering distant audiences access to personalities on the set, and to raise awareness of various issues from war zones to places of deep climate troubles. It may also be used in such a manner that the image from one portal structure is broadcast to all other portal structures in the network, live; those watching in the other portal structures, our outside the structure through open doors, could raise their hand or otherwise notify the main speaker that he or she has a question. The main speaker could then respond directly to the individual in a particular portal structure. In this way, a lecturer or presenter to can present to a live, dispersed audience, full-body, live, and engage with that audience directly.

In addition, the portal network architecture may be used to facilitate new, ongoing connections between people. For example, two people visiting portal structures and communication via them may opt to share their email addresses with one another after speaking. Similarly, individuals may be offered time slots to reserve the portal structures to speak with family or friends, or to be paired with someone else with similar interests.

As yet another application, the portal network architecture may be used as collaborative spaces in which to create live or pre-recorded public performances. Two musicians may improvise together; debaters may debate; or performance artists may collaborate on a new piece. The possibilities and applications are many. The immersive environment created within the portal structure or facility at remote locations offers its users a real-life communication experience with a relatively inexpensive method of assembling the portal structures with ease. By using state-of-the-art technology, for example, high resolution video and audio components, users may connect as long as there is internet access via a telecommunications network.

Referring also to FIGS. 5-9, creating a realistic image of another person on a screen within the portal interior is an interesting optical challenge that the portal structures (400, 410, and 420 in FIGS. 4A, 4B, and 4C and 300 in FIG. 3) described here address. There are significant challenges to accomplishing a realistic-appearing image on either side of the continuous communication experience. The main objectives of the "immersive" experience that are provided to those using the portal structures, is that both figures on either side of the communication channel maintain eye contact and see the full body (as a result of a full body image capture) of the person or persons in the other portal structure. In addition, in the portal structure, minimal distortion from the curvature of the lens is captured, by using a small lens that is minimally distracting to the viewer, and efficient in image capture, to prevent unnecessary capture of pixel data that has to be cropped out later. In some embodiments, to accomplish these objectives, the portal structure places a camera in a fixed location, thereby using a flat focal plane to create a 2D image of a person within a context of the rear of the portal structure, which is then projected onto a flat screen 404 (see FIG. 4A). It should be recognized that three fundamental optics principles come into play here, namely, 1) perspective, and the attendant perspective distortion, 2) relative illumination, and 3) f-theta distortion.

To ensure eye contact, the camera is placed close to eye level—roughly five and a half feet. At this height, to capture the full body and not capture excess material, particularly of the ceiling, the camera is tilted downward. In addition, the camera lens must have a wide enough field of view for the whole human body to be acquired within a relatively short distance. Tilting the camera down causes perspective distortion, namely the compression of the lower parts of the persons' body. The object's legs shrink, as a result of which the object image appears "squat." This presents a distorted perspective of the image. This distortion may be addressed and corrected by software techniques, but this often results in a lag in transmission, which is hardly desirable. Alternatively, it is possible to "keystone" the outputting projector, but this severely degrades the quality of the projected image, as this approach stretches the pixels. Also, the lens itself may be adjusted. This minimizes lag and maximizes quality of output. Further additional challenges that must be noted are perspective distortion and relative illumination and F-theta distortion, which are less critical, but can be resolved by further customizing the lens solution.

Figure 5:
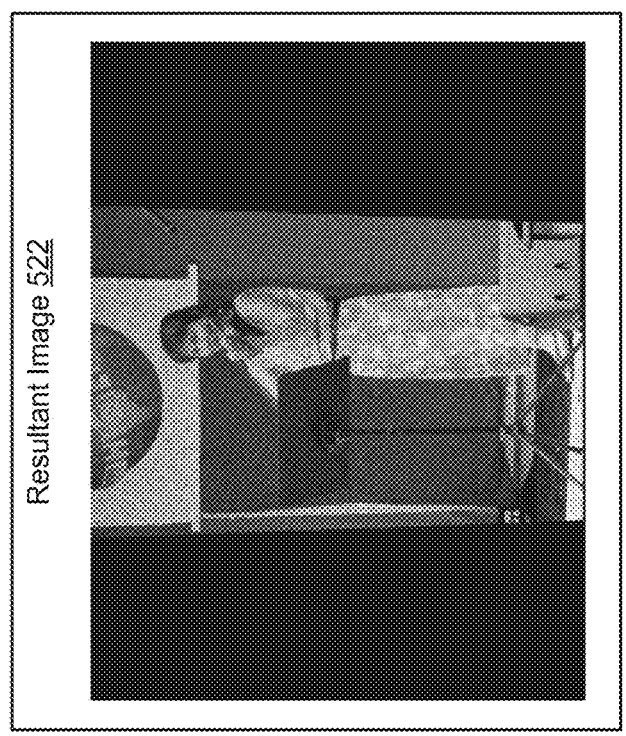
FIG. 5 is an optical schematic of the optical array from a camera (with a wide enough field of view of the human subject) positioned at eye level to confirm eye contact with the human subject, and then tilted downward to capture the full body of the human subject, illustrating a resulting distorted image that presents the human subject as "squat" in the image or more compressed at the lower part of the body.
Figure 5:
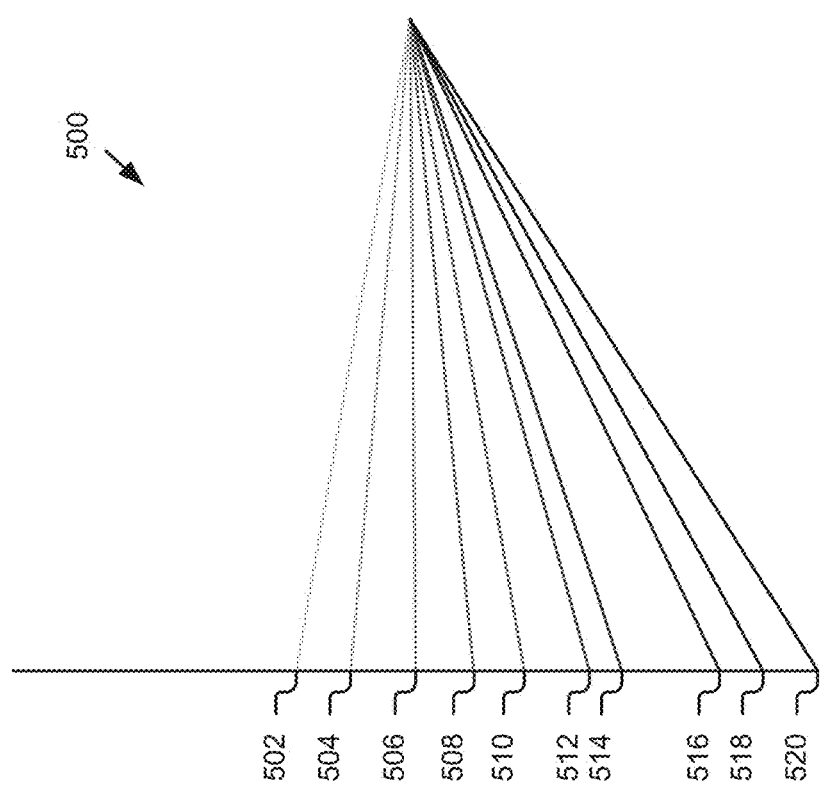
Figure 6:
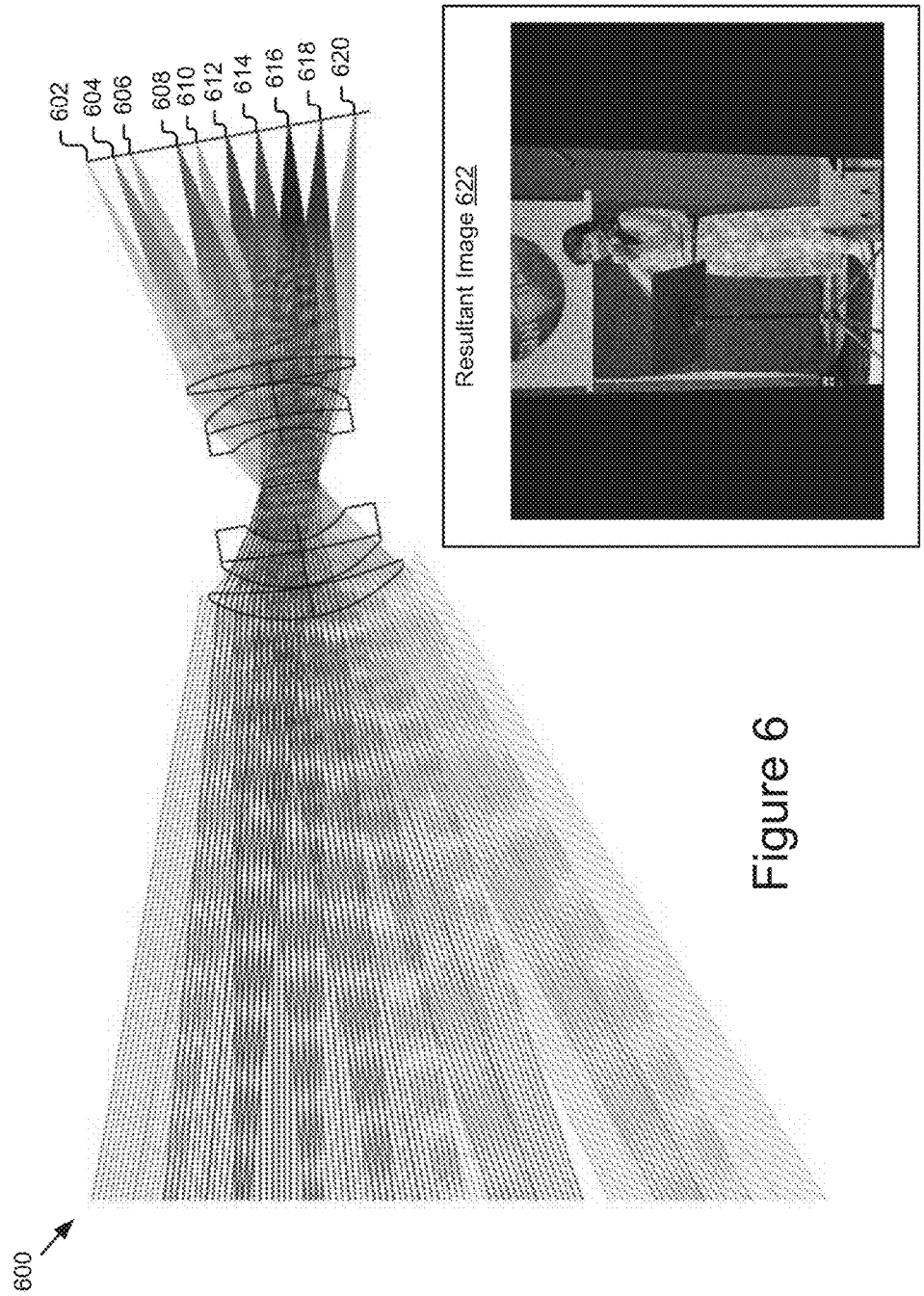
FIG. 6 is an optical schematic of the optical array from the camera, when it is tilted down, so the human subject is centered on the camera sensor.

Referring to FIG. 5, an image of the approach with the camera titled down is illustrated. This figure illustrates what the camera captures when the lens is titled down slightly. The optical lines from the aperture of the camera are indicated by reference numerals 502, 504, 506, 508, 510, 512, 514, 516, 518, and 520 and the resulting image 522 is shown as well. A close up of the lens tilted down is shown in FIG. 6, with the resultant image 622. The optical lines are illustrated by reference numerals 602, 604, 606, 608, 610, 612, 614, 616, 618, and 620. This camera configuration results in a distorted image, which is not a realistic projected image (the "squat" figure described above). Because the image is collected from the perspective of the camera, and then projected onto a flat plane before the observer, the image that is projected appears squat, with the legs appearing shorter than the torso. This resultant image demonstrates significant keystone distortions, with the legs shorter and the head enlarged. Horizontal features in the image are distorted and there is significant falloff in relative brightness of the bottom of the field. While this image resolves some issues, it does not appear realistic enough to create an illusion of a person in the same room. In addition, it can be noted by the camera array that the array is wider than it is tall.

Among the negative consequences of this placement are a) that while the face and torso of the subject is captured with any ordinary video camera, the perspective distortion causes the legs to appear shortened and not well resolved, b) the floor of the container in the image appears to tilt up away from the observer, and c) the relative brightness of the bottom and top of the field is dimmer than it is in the center of the image.

Figure 7:
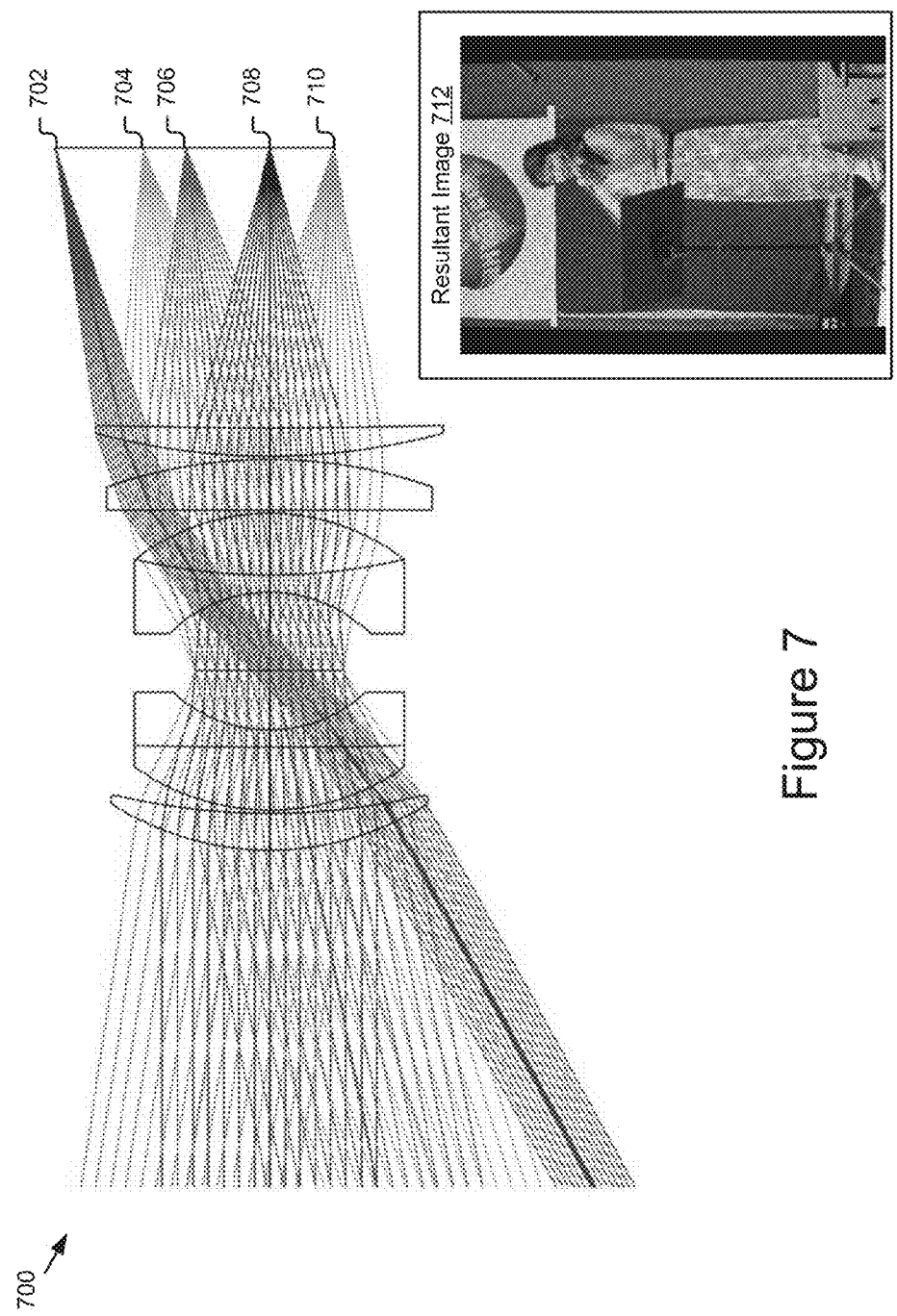
FIG. 7 is an optical schematic of the optical array from the camera, when the camera is placed horizontally at eye level and the lens is shifted down with respect to the camera to minimize the perspective distortion that forms the "squat" image. The resultant image is improved.

Customizing the camera optics and/or projection system can significantly enhance the realism of this image. This is illustrated in the next pair of figures. A test image is shown in FIG. 7. The person in the image is centered on the field, her body is proportionally correct, the vertical and horizontal features in the scene are straight and undistorted, and the illumination is uniform. FIG. 7 shows the resultant image 712 when viewed through the lens 700 illustrated in FIG. 7. The optical schematic illustrates the optical lines 702, 704, 706, 708, and 710.

Figure 8:
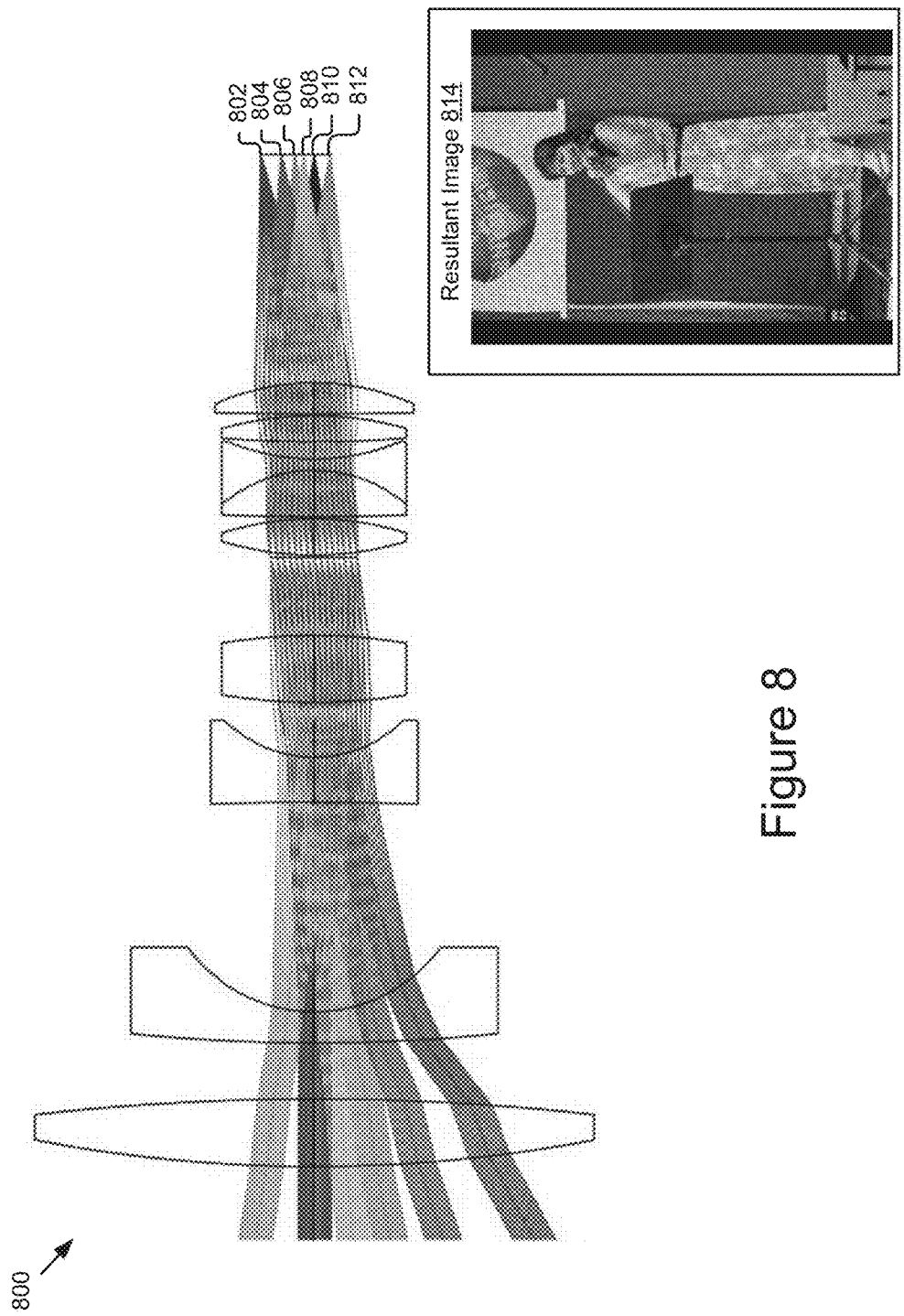
FIG. 8 is an optical schematic of the optical array from the new camera, addressing a further problem with relative illumination and f-theta. The resultant image is sharper.

The image exhibits significant keystone distortion, and her legs appear shortened while her head is enlarged. Horizontal features in the image are distorted, and there is significant falloff in brightness versus field. While it is well enough resolved, it does not appear realistic enough to create the illusion of a person in the same room. In addition, the camera array itself is wider than it is tall. To correct this imperfection, the camera configuration flips the camera sideways to estimate an aspect ratio of what may privilege height. In a conventional 4:3 horizontal format lens, this means only 40% or so of the useable field of view is actually displayed. This may be improved to 80% or so by using an HD format 16:9 camera on its side, but this is still relatively inefficient. One simple approach to removing the perspective distortion is to use a camera lens, which is designed for an even wider field of view, placed horizontally at eye level, and to shift the camera with respect to the lens to correct perspective. In order to utilize the format of the camera more effectively, the camera configuration rotates the camera 90 degrees, so the wider dimension of the camera is along the vertical axis, where the image is longer. A wide angle lens in this configuration is shown in FIG. 8, and the resultant image is shown in FIG. 8. The portal structure corrects the perspective distortion, and much more of the sensor is used, yet the image exhibits significant f-theta distortion. This is largely because lenses able to capture such wide angles tend to have 5% or more f-theta distortion as a result of the extremely wide range of angles, which must be accommodated.

This image is further improved, by using a wide field projection lens instead of a simple wide angle. Such lenses are designed to minimize distortion. An optical schematic of this kind of lens is shown in FIG. 8 and the resultant image 814 is shown in FIG. 8. The distortion is reduced by a factor of two, and the relative illumination is almost completely uniform. The disadvantage to using a projection lens like this is that they tend to be very large. A large lens is distracting to the observer and therefore undesirable. In some embodiments, a custom lens design is used for this specific application. The custom lens is small, has proper relative illumination and minimum distortion.

This camera configuration with this custom lens improves the image, by limiting the field of view required for the lens, by both tilting the lens and the detector downward, but allowing the lens groups to tilt and decenter with respect to each other as well. This flattens the field and results in more favorable distortion at the bottom of the field and less at the top.

Figure 9:
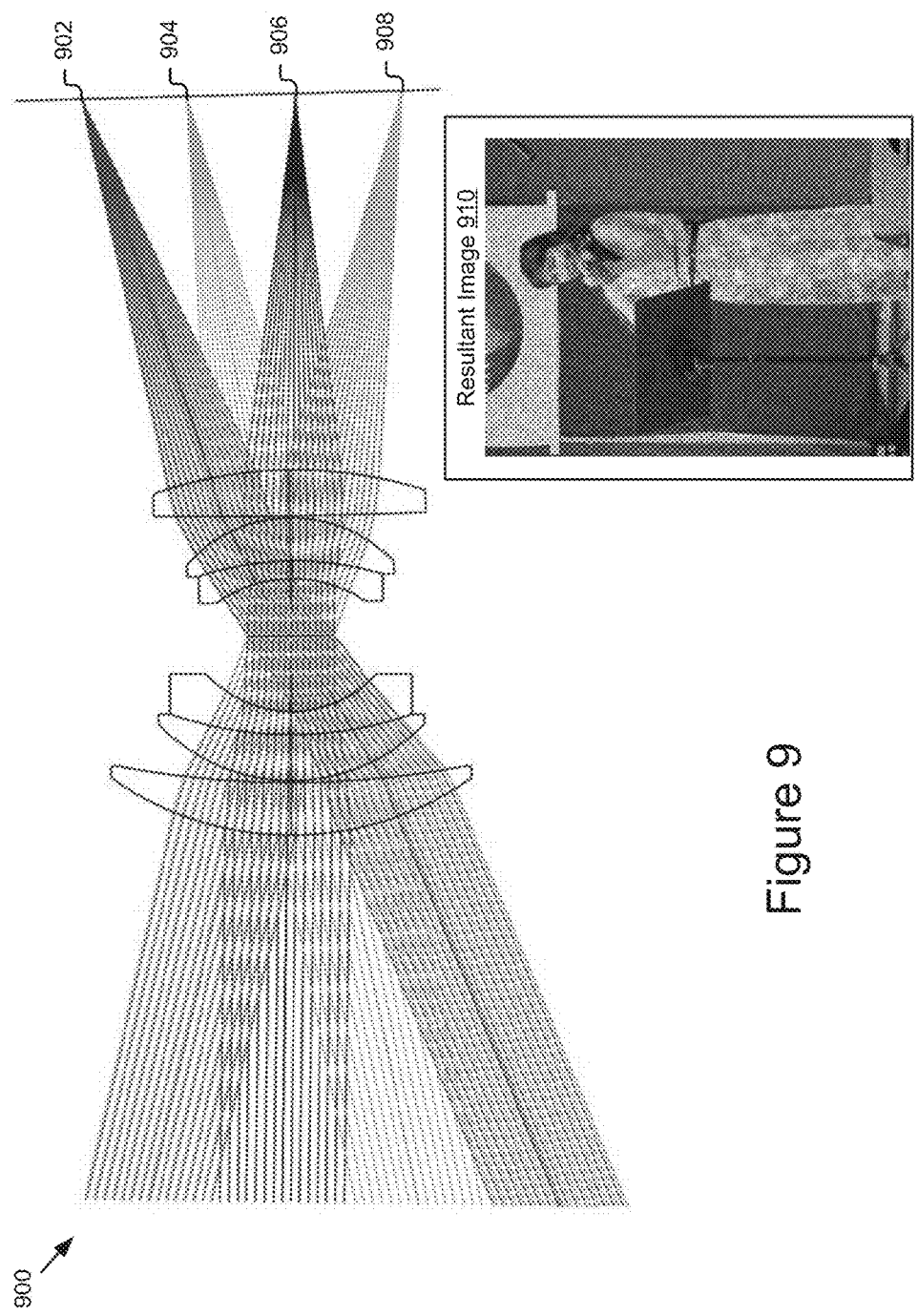
FIG. 9 is an optical schematic of the optical array from the custom new lens using a wide field projection lens designed to reduce distortion (instead of a simple wide angle). The resultant image is the ideal image; it is the sharpest and most realistic, minimizing perspective, f-theta and relative illumination distortion.

This lens is shown in FIG. 9, and the resultant image is shown in FIG. 9. This camera configuration is compact, efficient, and provides an undistorted image of the object as illustrated by the resultant image 910. The optical array of optical lines through the lens 900, are illustrated by reference numerals 902, 904, 906, and 908.

Figure 10:
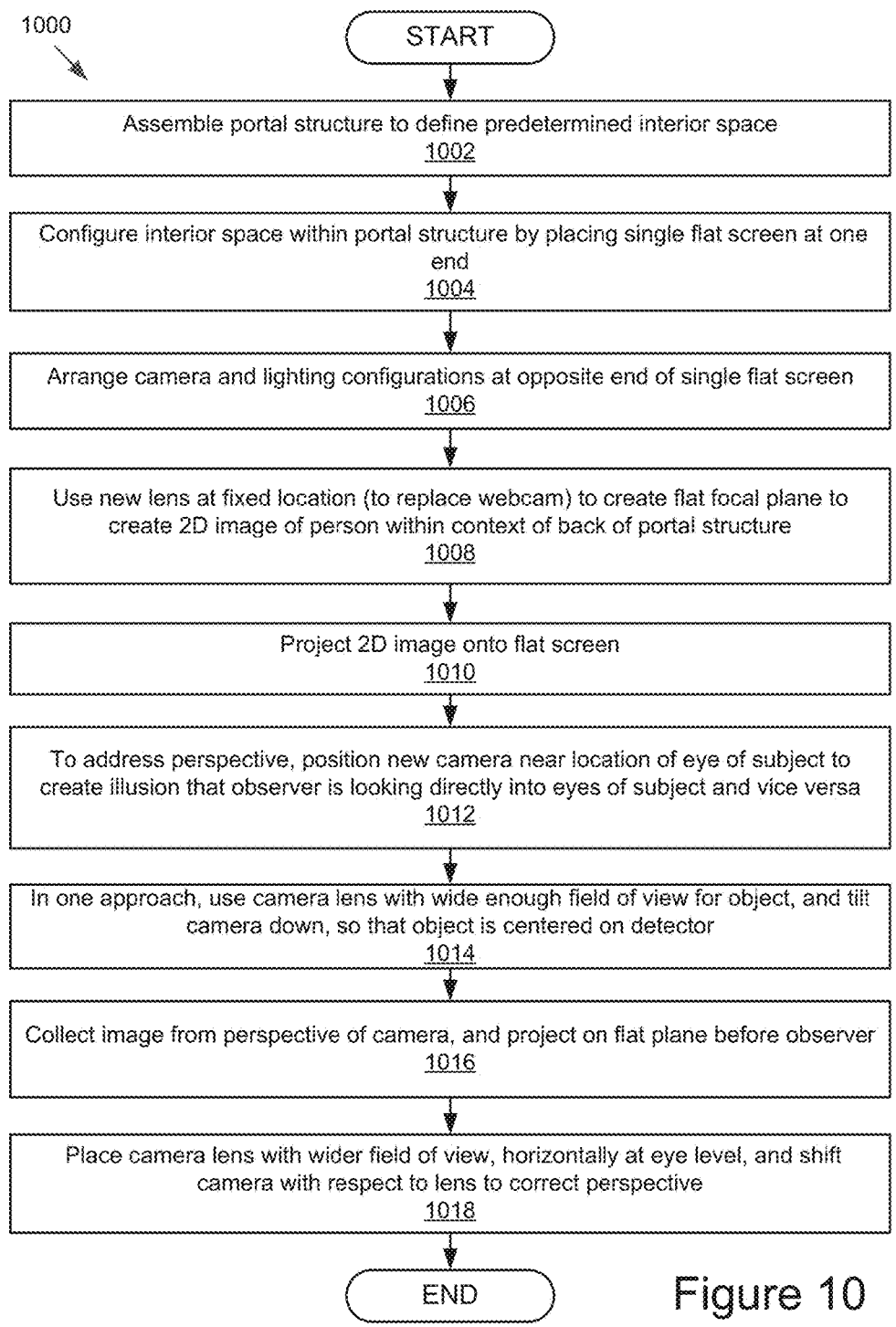
FIG. 10 is a flow chart illustrating the steps for creating the portal network architecture and configuring the interior of the portal space with the camera and projector configurations and lighting to create the immersive effect for communication.

Referring now to FIG. 10, the process 1000 of creating architecture of networked portals is illustrated. The process 1000 includes operations, illustrated by block 1002, including one or more operations for assembling portal structures and defining identical interior spaces at two disparate locations. The process 1000 proceeds to the next block 1004, including one or more operations for configuring the interior spaces within the portal structures by placing a single flat screen at one end within the portal structure. The process 1000 proceeds to the next block 1006, including one or more operations for arranging camera and lighting configurations at an opposite end of a single flat screen. The process 1000 proceeds to the next block 1008, including one or more operations for using a new custom lens and placing it at a fixed location (to replace the existing webcam) to create a flat focal plane to create a 2D image of a person or object within the context of the rear of the portal structure. The process 1000 proceeds to the next block 1010, including one or more operations to project the 2D image onto the flat screen. The process 1000 proceeds to the next block 1012, including one or more operations for position the new camera configuration near the location of the eye of the subject to create an illusion that the observer is looking directly into the eyes of the subject and vice versa. The process 1000 proceeds to the next block 1014, including one or more operations for using the camera with a wide field projection lens of view for the object, and tilt the camera down, so that the object is centered on the detector. The process 1000 proceeds to the next block 1016, including one or more operations for collecting images from perspective of the camera, and projecting them on the flat plane before the observer. The process 1000 proceeds to the next block 1018, including one or more operations for placing the camera lens with a wider field of view, horizontally at eye level, and shifting the camera with respect to the lens to correct perspective.

It should be recognized that the portal structures may incorporate "channels" to enable full-size, real-time connection between disparate public, with applications in advertising, marketing, surveillance, security, and more. In accordance with one application, a real estate company that wants to keep a detailed eye on a construction site and be able to interact with crew on the ground can install two "channels," one in the corporate headquarters and one in the field (or many in various fields) and be able to see construction sites in live action and engage teams through both audio and video. That same firm may wish to show their work to potential clients, and use a "channel" to promote their work. Two dance troops may wish to use the same technology to rehearse across distance or perform. The applications and uses for channels are many and varied. Channels may be implemented by creating convincing life-size video walls that connect two disparate spaces and seek to create the illusion of continuity.

An implementation of "channels" creates the impression of connecting two spaces, which in reality are far apart. As one example, a wall of a building or even a free-standing screen is used on which an image of a park or building that is being videoed at a different location is projected. This may be accomplished by using a wide-field lens and a very high resolution camera, which collects the image and projects that image onto the wall. Use of a wide-field lens from a single location has problems of perspective and distortion which are not ideal. The portals structure had an enclosed and relatively darker space with a single viewer at a single viewpoint. In this scenario, only the perspective and f-theta distortion for that single viewpoint were corrected, by use of several optical methods, example, using a tilted lens, a field-shifted wide-field lens, a tilt-shifted projection lens, and a custom designed mapping lens with induced f-theta distortion to counteract perspective distortion. These same techniques may be employed to improve the perspective and f-theta distortion of the wide-field lens for communication by channels. But this only corrects a single perspective.

For communication by channels, an impression of open space is created, while still retaining as much realism as possible. To accomplish realistic perception of a scene viewed through channels, the display must be as convincing as possible when viewed from multiple locations. As one example, a flat stationary image of a large space only appears realistic when viewed from the perspective from which it was taken. At all other viewing positions, it will appear tilted, and the perspective lines which we use as visual cues for distance will not converge correctly before our eyes. Even if multiple cameras are used to record the scene and merge them by software to minimize perspective distortion, the scene does not shift as we view it from different locations. Furthermore, near objects do not shift with respect to the background like they would with a real three dimensional image.

Both of these effects can be minimized, by removing the visual cues that we use for perspective. For example, an open area seen from a distance on a cloudy day has fewer visual cues to alert us to the perspective, and would not be expected to shift very much as we move our head. One may create this illusion by providing the screen at a height or above the viewpoint, and projecting on it, a scene of a hill, or a park, or perhaps a building with multiple windows. By crafting the foreground so that it appears as if a viewer is looking over a wall, say, would help to bring the viewer into the image.

Both these two factors may be used as an advantage to improve the quality of the illusion. One trick that may be used is to place real objects in the foreground, which appear to be related to the far-away scene. For example, imagine three screens, each, quite large and arranged in a row along a wall, with window boxes and frames and other decoration in front of them. These real objects draw a near focus and have proper perspective. If three cameras are used to view the inside of a café, perhaps, from three different perspectives along one wall, each of those images would show a different part of the café from a distinct viewpoint. As a viewer walks past the windows, he or she would see all the visual cues for distance as nearer tables shifted with respect to scenery at the opposite side of the café. The problem would exist that, as they walked past any one of those windows, the scene would not shift, so they can improve the quality of the illusion by creating a shadowbox and mounting the screen at the inside end of it, so that the viewable locations would be reduced for each individual window.

Another approach that may be used is to place real objects within the scene itself. This may be accomplished by splitting the shadow-box into two parts and by using a partial mirror to combine them, much like the arrangement of a pepper's ghost geometry. By this, though, one side of the shadow box may be used to project the image of near-field, stationary objects, such as posts or trees, and the other side of the box may be used to project far field scenes. As the viewer moves his or her perspective, the near objects would shift with respect to the far field scene, creating a cue that the objects are in fact at different distances (because they are). This could also be done in reverse, by having our object scene at the near-field location and a horizon projected at a long distance behind it.

Yet another approach, a totally different method of creating the illusion, is to leave many visual cues for perspective within the scene, and then move the camera position to the correct perspective location to match the viewer's current location. For example, one could mount the camera which is recording the image to a rail, which is motorized so that it can move along the rail over the distance of potential viewing angles for an observer. By detecting the location of the observer using motion detection or pattern recognition, the camera may then be moved as the observer moves past the scene. One may even imagine doing this in more than one direction, and with a perspective tilt, as well. If the scene were fairly inactive, this may even be accomplished by recording the scene from different angles and then displaying the view which corresponds to the observer's location.

Yet another approach uses a kind of lenticular multiple image strategy, like on the old "vari-vue" trading cards, but for video projection. This would involve a plurality of cameras, placed to simultaneously record the scene and then display so that each image may only be seen from one small range of angles. As the viewer moves, he or she has the ability to see the images generated by the different cameras. For example, in some embodiments, one may use ten cameras recording a scene from ten different perspectives. These images may then be multiplexed into a single image, such that every tenth vertical column of pixels contains data from the same camera. This image is then shown on a custom lenticular display, similar to an autostereoscopic display or a parallax barrier display, but where, each column is masked or louvered so that the view of most of the sets of columns was obscured for any given viewing angle over a wide range of angles. Thus, as the observer moves with respect to the display, his or her view shifts from one of the sets of columns to the next. This is similar to the moving camera solution, but has the advantage of being static, so it may be viewed by multiple viewers simultaneously.

Figure 11:
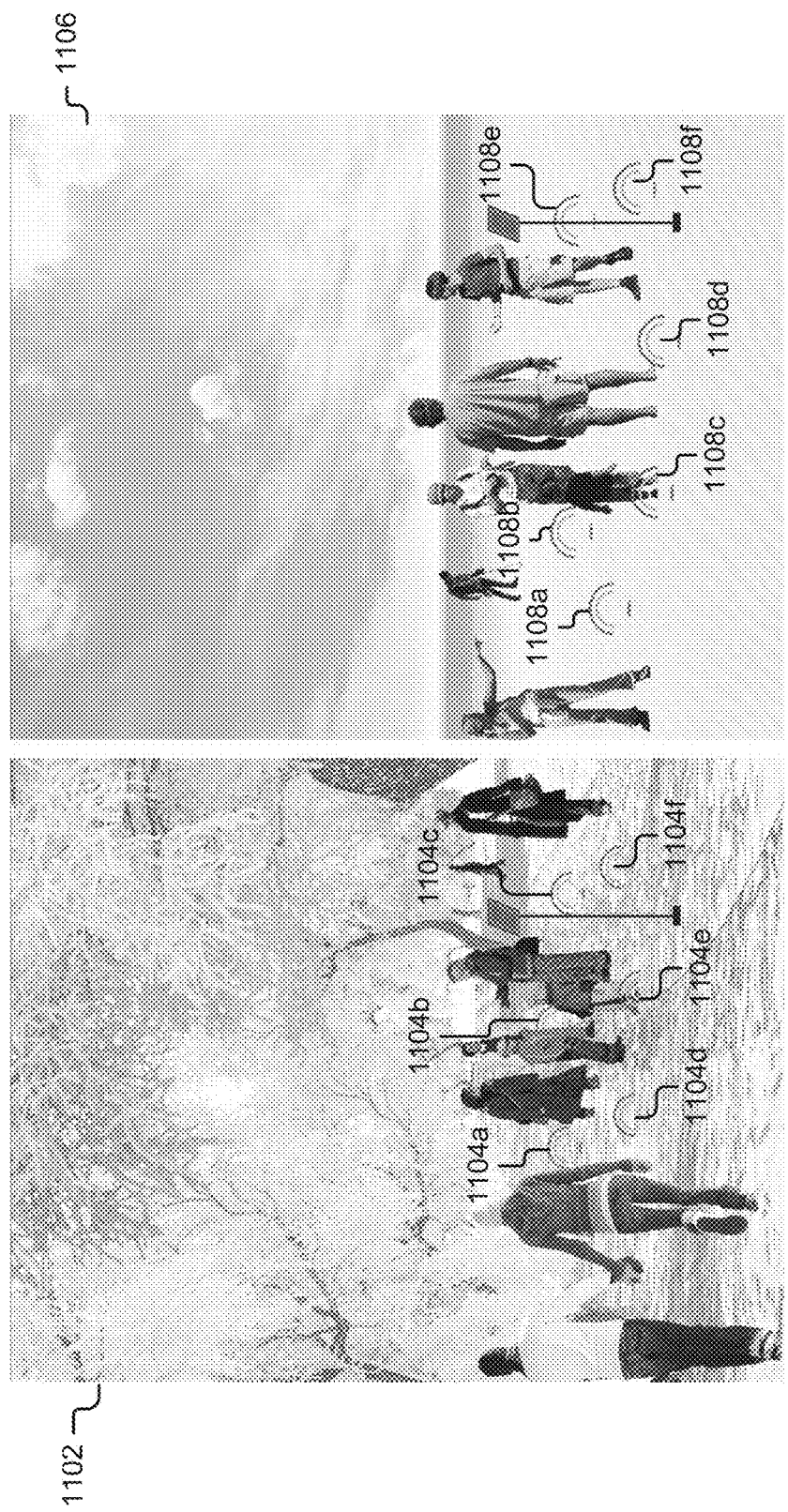
FIG. 11 is an image representation of the "phonos" implementation similar to the "channels" implementation and is often used in conjunction with it, which creates an unmediated aural link between different locations enabling both real-time conversation and the transmission of ambient sounds. The ambient sounds may be desired both for monitoring and production purposes and for advertising and marketing.

Referring now to FIG. 11, like "channels," and often in conjunction with it, "phonos," creates an unmediated aural link between different locations, enabling both real-time conversation and the transmission of ambient sounds. This may be advantageous for both monitoring and production purposes, and for advertising and marketing. "Phonos" is a surround-sound implementation that provides a free, unmediated, and live aural link between disparate public spaces. A user standing in the center of a "phonos" implementation in location A experiences a surround-sound reproduction of the acoustic environment in location B, while user B simultaneously experiences a surround-sound reproduction of the acoustic environment in location A. In addition to experiencing this immersive audio landscape, transmitted by bi-directional communication lines, users have the option to engage in conversation over any or all of the audio channels.

Figure 13:
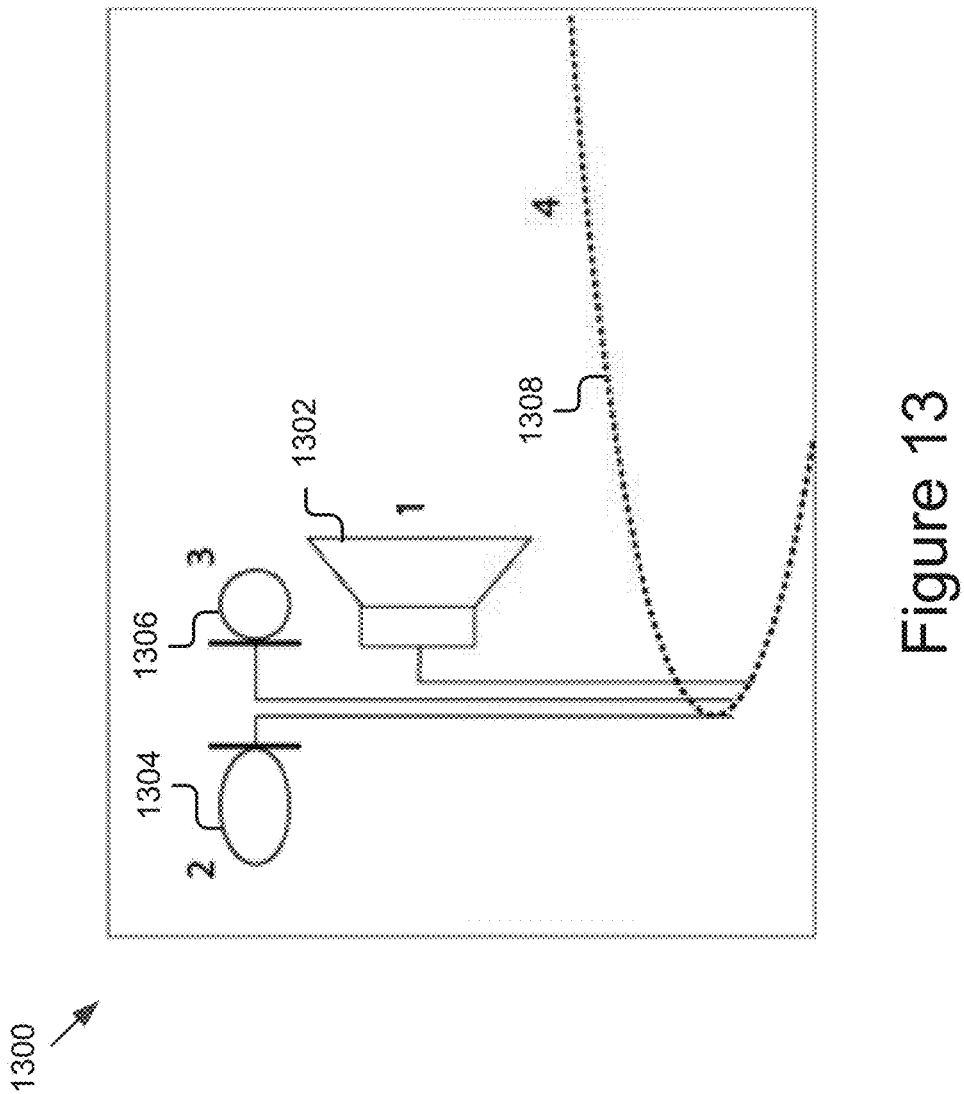
FIG. 13 is a graphic representation illustrating the profile of a node. The speaker (1) and the cardioid microphone (2) face inward towards the center of the circle (4) while the shotgun microphone (3) faces outward.

A "phonos" implementation may be configured and constructed by a number of nodes that are equally spaced around the circumference of a circle. In FIG. 11, the image 1102 illustrates a plurality of nodes 1104a, 1104b, 1104c, 1104d, 1104e, and 1104f The image 1106 illustrates a plurality of nodes 1108a, 1108b, 1108c, 1108d, 1108e, and 1108f As illustrated in FIG. 13, a node consists of one speaker and two microphones. The speaker faces inward towards the center of the circle where the users reside. Above each speaker, one shotgun microphone is placed and configured to face outward from the circumference of the circle, to capture ambient signals from the surrounding environment. Directly adjacent, a cardioid microphone is placed and configured to face inward towards the center of the circle to captures the voice or activity of the subject(s) inside the "phonos" sphere. Each pair of microphones on each of the n nodes in location A is combined and wirelessly transmitted to its respective speaker in location B. Simultaneously, each speaker in location A is receiving and reproducing the sum of all the signals from the respective node in location B.

Each "phonos" sphere requires an audio interface, a digital signal processing (DSP) device, and a transmitter/receiver unit. The interface requires 2n inputs and n outputs and provides audio-to-digital and digital-to-audio converters. Via the interface, n balanced XLR cables connect the receiver outputs to the n speakers while 2n balanced XLR cables connect the 2n microphones to a DSP followed by a transmitter. The DSP (in the form of custom hardware or custom software running on a computer) handles all the signal processing required to ensure high quality audio. An odd number of nodes may be used to avoid direct feedback between the inwardly facing microphones and their opposite inwardly facing speakers within a given location. However, even with an odd number of nodes, signal processing is required to eliminate feedback and to ensure high fidelity. The first step in the DSP signal path is an echo-cancellation algorithm to remove any highly correlated delayed sound that occurs as a result of feedback from an opposite of adjacent speaker. Next, the two microphone signals from each node are combined using a dynamic mixing algorithm. Conversation through "phonos" is encouraged, so vocal signals are favored over environmental sounds. For example, if the outward facing microphone signal overwhelms what is detected to be a vocal signal from the inward microphone, automatic ducking initiates, to balance the levels and allow conversation to proceed comfortably. Last on the signal path, is light compression and heavy limiting so high amplitude signals never result in clipping or distortion in the speakers. After the 2n microphone signals are mixed and processed into n audio channels, each is transmitted in parallel over the network. It is essential that each signal be transmitted in parallel to maintain the surround-sound environment being reproduced.

Additional challenges arise from the fact that "phonos" are meant for public spaces. An effective implementation requires unobtrusive equipment that can weather the elements and prevent theft. All audio and power cables may be hidden underground in waterproof piping, while the speakers and microphones emerge from the ground or floor and are placed at any height, depending on the desired effect. Plastic caps may be placed over each node in the event of rain and pop filters surround each microphone reducing vocal plosives and distortion as a result of wind. The transmitter/receiver/DSP unit is set apart from the "phonos" sphere so as not to distract users. This unit is connected to power as well as an internet connection.

Referring now to FIG. 11a, in accordance with some embodiments, "channels" indicated by reference numeral 1150, are implemented by creating a video wall configuration. These "channels" create bi-directional audio-visual walls, in essence creating an open window. In this illustration, the video wall has four screens divided by a bezel with a camera configuration placed in the vertical bezel, illustrated and referenced by reference numeral 1152. In some embodiments, the camera may be located at a desirable height from the ground, e.g., five and a half feet from the ground. Microphone and speaker arrays are set up behind the screens. The height and the tilt of the camera vary depending on how far the screens are positioned from pedestrians or viewers. The camera configuration 1152 may be tilted appropriately, based upon the camera lens angle, height of the camera, and the distance to the pedestrian or viewer. These channels are interoperable with portals. Participants in the portals may view the person in front of the channels.

FIG. 11b illustrates the camera configuration 1152 illustrated in FIG. 11a, placed in the bezel of the video wall or "channel." The camera may be oriented either tilted (as shown by broken lines) or oriented facing directly forward. Referring now to FIGS. 11c and 11d, the video wall or "channel," has a camera configuration 1154 in accordance some other embodiments of the present invention. This camera configuration 1154 is rectangular and houses within the bezel.

Referring now to FIG. 11e, a linear assembly of continuous video walls or "channels," indicated by reference numeral 1156 may be created in accordance with some embodiments the present invention. Camera configurations may be located at locations that are determined to best capture the image of the person facing the video wall. Such video walls may be placed adjacent to each other to create video walls that can stretch an entire city block. Referring now to FIG. 11f a curved assembly of continuous video walls or "channels" indicated by reference numeral 1158 are created in accordance with the some embodiments of the present invention. FIG. 11g illustrates panels of video walls or "channels," arranged in a configuration, where they are separated from each other. With this configuration, a speaker standing before the arrangement can communicate directly with locations all over the world, for example, each of the separate panels may connect to disparate locations. For example, one may connect to Mexico City, in Mexico, another to London, England, another to a global network site (connecting to many more sites), and yet another to Seoul, Korea. Life-size images create a sense that everyone is in the same environment, conversing.

Figure 12:
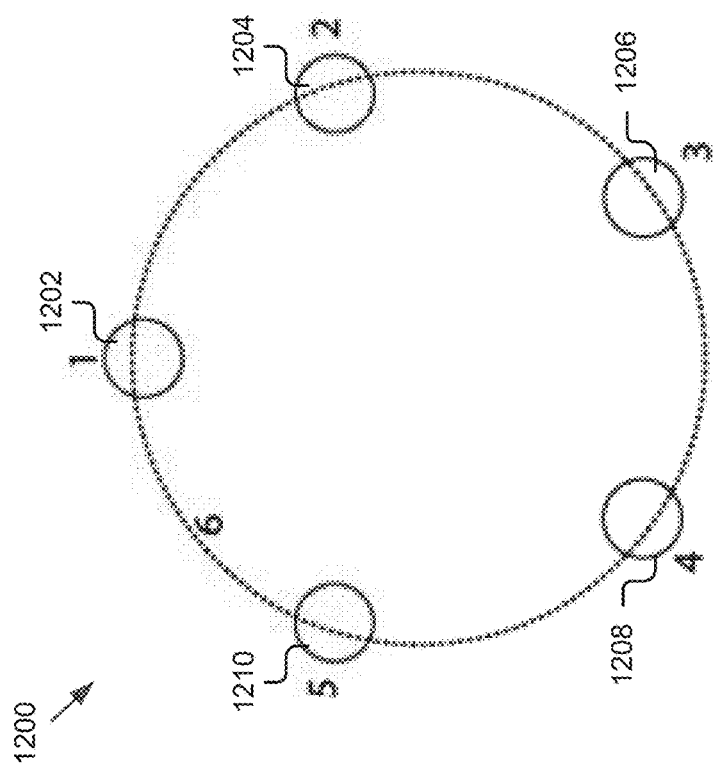
FIG. 12 is a graphic representation illustrating an odd number of nodes (1-5) equidistantly distributed over the circumference of a circle (6). Each node consists of an inwardly facing speaker and 2 microphones, as shown in FIG. 13.

Referring now to FIG. 12, reference numeral 1200 illustrates an odd number of nodes (1-5) equidistantly distributed over the circumference of a circle (6). Each node depicts an inwardly facing speaker and two microphones, as shown in FIG. 13. The five nodes 1-5 are indicated by reference numerals 1202, 1204, 1206, 1208, and 1210, respectively.

Referring now to FIG. 13, the profile of a node is illustrated. The speaker (1), referenced by reference numeral 1302, and the cardioid microphone (2), referenced by reference numeral 1304, face inward towards the center of the circle (4), referenced by reference numeral 1308, while the shotgun microphone (3), referenced by reference numeral 1306 faces outward.

Figure 14:
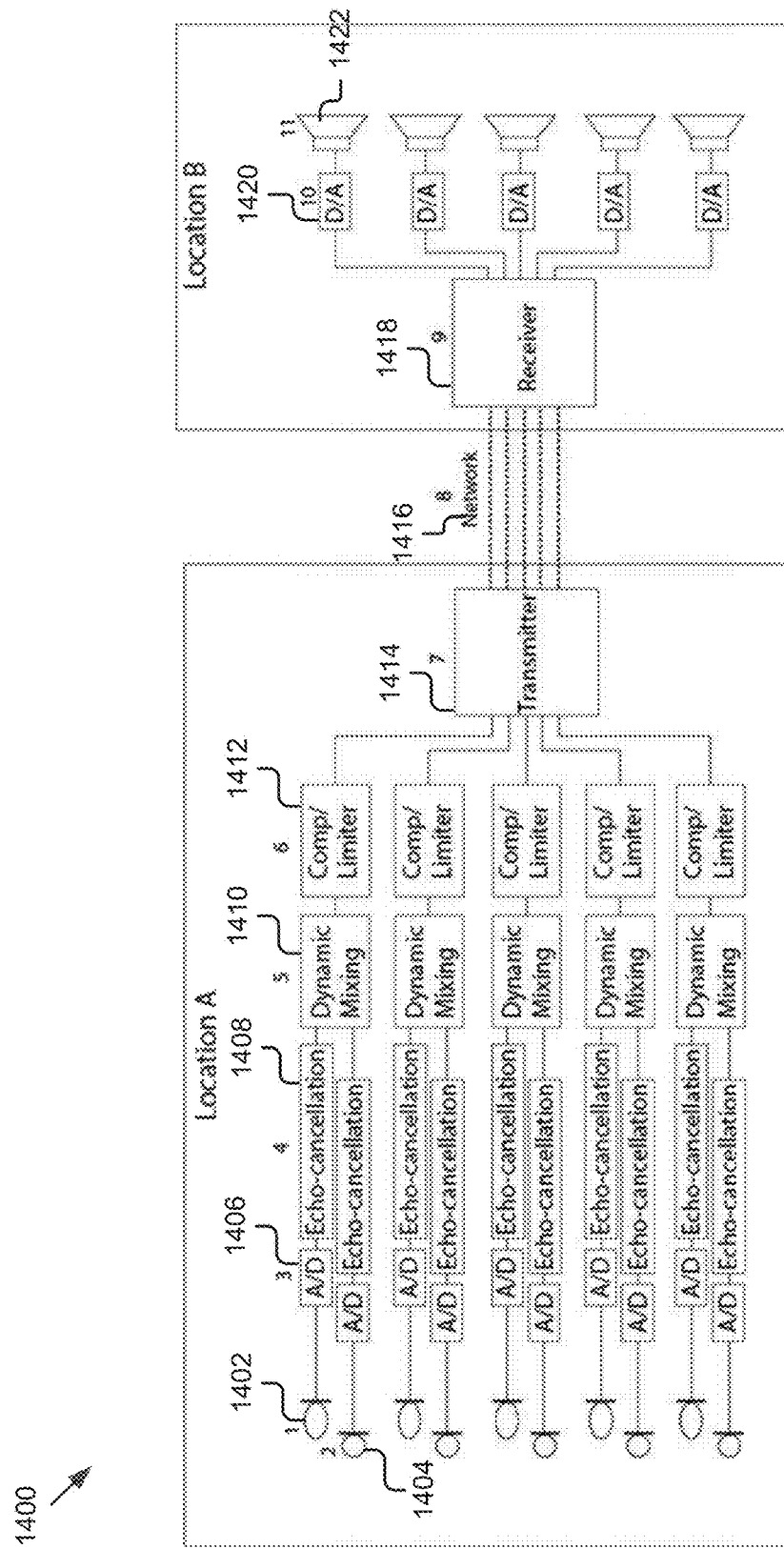
FIG. 14 is a graphic representation illustrating the signal path between 5 nodes in example locations A and B, respectively. Each of the shotgun (1) and cardioid (2) microphones in location A, go through an analog-to-digital converter (3) followed by an echo-cancellation algorithm (4). These two signals are combined using a dynamic mixing algorithm (5) to balance the ratio of a vocal signal to an environmental signal. Following a compressor and limiter (6) the 5 signals are transmitted (7) in parallel over the network (8). In example location B, the 5 signals arrive through a receiver (8) and pass through a digital-to-analog converter (9) before reaching the speakers (10) in location B.

Referring now to FIG. 14, the signal path between 5 nodes in example locations A and B, respectively, are illustrated. Each of the shotgun (1), referenced by reference numeral 1402, and cardioid (2) microphones, referenced by reference numeral 1404, in location A, are coupled through an analog-to-digital converter (3), referenced by reference numeral 1406, and subject to an echo-cancellation algorithm (4), referenced by reference numeral 1408. These two signals are combined using a dynamic mixing algorithm (5), referenced by reference numeral 1410, to balance the ratio of a vocal signal to an environmental signal. Following a compressor and limiter (6), referenced by reference numeral 1412, the 5 signals are transmitted via transmitter (7), referenced by reference numeral 1414 (also illustrated as 220a in FIG. 2), in parallel over the network (8), referenced by reference numeral 1416 (also illustrated in network 102 in FIG. 1). In example location B, the five signals arrive through a receiver (9), referenced by reference numeral 1418 (also illustrated as 220b in FIG. 2), and pass through an array of digital-to-analog converters (10), referenced by reference numeral 1420 before reaching the speakers (11), referenced by reference numeral 1422, in example location B.

Reference in the specification to "some embodiments" or "an embodiment" means that a particular feature, structure, or characteristic described in connection with the embodiment is included in at least some instances of the description. The appearances of the phrase "in some embodiments" in various places in the specification are not necessarily all referring to the same embodiment.

Some portions of the detailed description are presented in terms of algorithms and symbolic representations of operations to be performed by the components of the system described, either on data bits within a computer memory of the components or otherwise. These algorithmic descriptions and representations are the means used by those skilled in the data processing and telecommunications arts to most effectively convey the substance of their work to others skilled in the art. An algorithm is here, and generally, conceived to be a self-consistent sequence of steps leading to a desired result. The steps are those requiring physical manipulations of physical quantities or components. Usually, though not necessarily, these quantities (within the electrical or optical components) may take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system or computerized component, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may include a general-purpose computer or electrical or optical component selectively activated or reconfigured by a computer program stored in the computer or instructions in a controller. Such a computer program may be stored in a computer readable storage medium, such as, but not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Certain components described in the specification may take the form of an entirely hardware embodiment, an entirely software embodiment, or embodiments containing both hardware and software elements. In some embodiments, these components described in the specification may be implemented in software, which includes but is not limited to firmware, resident software, microcode, etc.

Furthermore, the description of such components may take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, remote printers, social network data stores, or other venues, through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the parts of the specification are not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense and the invention is to be considered limited solely by the scope of the appended claims.

What is claimed is:

1. A system for enhancing bi-directional audio-visual communications over a communication link, among at least a subject and a plurality of observers located at separate, remote locations, comprising:
    a plurality of panels with screens arranged to create and serve as at least one of a plurality of video walls located at two ends of the communication link, wherein each panel has at least one screen on which images are projected;

at least one camera configuration embedded in a vertical bezel of the screen and configured to capture continuous images of the subject and transmit the images across the communication link to the observers, the camera configuration including a camera with a type of camera lens, the camera positioned facing the subject, with the type of camera lens oriented based upon a computation including a predetermined angle of the camera lens, a predetermined height of the camera from ground, and a distance to the subject, the camera configuration further comprising a field-shifted wide-field lens, a tilt-shifted projection lens, and a custom designed mapping lens with induced f-theta distortion to counteract perspective distortion;

audio-visual communication interface between the subject and the observers for conveying audio communications between the two ends of the communication link; and an inwardly-facing speaker and a pair of microphones positioned at each of a predetermined number of nodes equidistantly distributed over the circumference of a circle.

2. The system according to claim 1, wherein the video walls are sized to display life-size figures of the subject and at least one of the observers, the inwardly-facing speaker and a first cardioid microphone of the two microphones positioned to face inward towards the center of the circle and a second shotgun microphone of the two microphones adapted to face outward.

3. The system according to claim 1, wherein the audio-visual communication interface comprises a third microphone for audio communication, located behind the screen of the at least one video wall.

4. The system according to claim 1, further comprising a second speaker located behind the screen of the at least one video wall.

5. The system according to claim 1, further comprising a transmitter for transmitting captured images and audio and a receiver for receiving captured images and audio.

6. The system according to claim 1, wherein the plurality of panels with screens created to serve as video walls are arranged in a curved assembly of continuous video walls.

7. The system according to claim 1, further comprising:
an analog-to-digital converter coupled to the inwardly-facing speaker and the two microphones to receive a first vocal signal conveying real-time conversation between the subject and the observer and a second environmental signal conveying ambient sounds detected in the surrounding environment;
an echo-cancellation algorithm applied to the first vocal signal and the second environmental signal received from the analog-to-digital converter;
a dynamic mixing algorithm for combining the first vocal signal and the second environmental signal to balance the ratio of the first vocal signal to the second environmental signal; and
a compressor and limiter that transmits the first vocal signal and the second environmental signal over the communication link.

8. A method for bi-directional audio-visual communications over a communication link, among at least a subject and a plurality of observers located at separate, remote locations, comprising:
positioning a plurality of panels with screens arranged to create and serve as video walls located at two ends of the communication link, wherein each panel has at least one screen on which images are projected;
embedding at least one camera configuration in a vertical bezel of the at least one screen, the camera configuration including a camera with a type of camera lens;
positioning the camera facing the subject, with the type of camera lens oriented based upon a computation including a predetermined angle of the camera lens, a predetermined height of the camera from ground, and a distance to the subject, the camera configuration further comprising a field-shifted wide-field lens, a tilt-shifted projection lens, and a custom designed mapping lens with induced f-theta distortion to counteract perspective distortion;
capturing continuous images of the subject for projection on the at least one screen;
transmitting the images that are captured across the communication link for projection on the at least one screen for the observers to view;
linking an audio-visual communication interface between the subject and the observers for conveying audio communications between the two ends of the communication link; and
positioning an inwardly-facing speaker and a pair of microphones at each of a predetermined number of nodes equidistantly distributed over the circumference of a circle.

9. The method according to claim 8, wherein the video walls are sized to display life-size figures of the subject and the observers, the inwardly-facing speaker and a first cardioid microphone of the two microphones are positioned to face inward towards the center of the circle and a second shotgun microphone of the two microphones is adapted to face outward.

10. The method according to claim 8, wherein the audio-visual communication interface comprises a third microphone for audio communication, located behind the screen of the video wall.

11. The method according to claim 8, further comprising:
positioning a second speaker behind the screen of the video walls.

12. The method according to claim 8, further comprising:
transmitting captured images and audio by a transmitter; and
receiving captured images and audio by a receiver.

13. The method according to claim 8, wherein the plurality of panels with screens to create and serve as video walls are arranged in a curved assembly of continuous video walls.

14. The method according to claim 8, further comprising:
coupling an analog-to-digital converter to the inwardly-facing speaker and the two microphones to receive a first vocal signal conveying real-time conversation between the subject and the observer and a second environmental signal conveying ambient sounds detected in the surrounding environment;
balancing the ratio of the first vocal signal to the second environmental signal by applying an echo-cancellation algorithm to the first vocal signal and the second environmental; and
using a compressor and limiter that transmits the first vocal signal and the second environmental signal over the communication link.

15. The system according to claim 1, wherein the subject and at least one observer positioned in the center of the circle at either end of the communication link experience simultaneously a surround-sound reproduction of an acoustic environment in the other end of the communication link.

16. The system according to claim 1, wherein the shotgun microphone is positioned directly above the inwardly-facing speaker.

17. The system according to claim 1, wherein each pair of microphones at each of the nodes in a first location at one end of the communication link is combined and wirelessly transmitted to a respective speaker at the other end of the communication link, wherein each speaker in the first location is simultaneously receiving and reproducing the sum of all signals from a respective node in a second location.

18. The method according to claim 8, wherein the subject and at least one observer positioned in the center of the circle at either end of the communication link experience simultaneously a surround-sound reproduction of an acoustic environment in the other end of the communication link.

19. The method according to claim 8, wherein the shotgun microphone is positioned directly above the inwardly-facing speaker.

20. The method according to claim 8, wherein each pair of microphones at each of the nodes in a first location at one end of the communication link is combined and wirelessly transmitted to a respective speaker at the other end of the communication link, wherein each speaker in the first location is simultaneously receiving and reproducing the sum of all signals from a respective node in a second location.

* * * * *